US012100902B2

(12) United States Patent
Gao et al.

(10) Patent No.: US 12,100,902 B2
(45) Date of Patent: Sep. 24, 2024

(54) RADIATOR FOR TERAHERTZ ELECTROMAGNETIC RADIATION

(71) Applicant: City University of Hong Kong, Kowloon (HK)

(72) Inventors: Liang Gao, Kowloon (HK); Chi Hou Chan, Kowloon (HK)

(73) Assignee: City University of Hong Kong, Kowloon (HK)

( * ) Notice: Subject to any disclaimer, the term of this patent is extended or adjusted under 35 U.S.C. 154(b) by 194 days.

(21) Appl. No.: 17/860,480

(22) Filed: Jul. 8, 2022

(65) Prior Publication Data

US 2024/0014562 A1 Jan. 11, 2024

(51) Int. Cl.
*H01Q 9/04* (2006.01)

(52) U.S. Cl.
CPC .................................. *H01Q 9/045* (2013.01)

(58) Field of Classification Search
None
See application file for complete search history.

(56) References Cited

U.S. PATENT DOCUMENTS

| | | | |
|---|---|---|---|
| 9,344,308 B2 | 5/2016 | Han et al. | |
| 10,587,223 B2 | 3/2020 | Han et al. | |
| 10,998,855 B2 | 5/2021 | Momeni et al. | |
| 2012/0062286 A1* | 3/2012 | Ginsburg ............ | H03F 3/45188 327/147 |

OTHER PUBLICATIONS

X. Yi et al., "Emerging terahertz integrated systems in silicon," IEEE Trans. Circuits Syst. I, Reg. Papers, vol. 68, No. 9, pp. 3537-3550, Sep. 2021.

P. Hillger, J. Grzyb, R. Jain, and U. R. Pfeiffer, "Terahertz imaging and sensing applications with silicon-based technologies," IEEE Trans. THz Sci. Technol., vol. 9, No. 1, pp. 1-19, Jan. 2019.

C. Wang, B. Perkins, Z. Wang, and R. Han, "Molecular detection for unconcentrated gas with PPM sensitivity using 220-to-320-GHz dual-frequency-comb spectrometer in CMOS," IEEE Trans. Biomed. Circuits Syst., vol. 12, No. 3, pp. 709-721, Jun. 2018.

C. Wang et al., "Chip-scale molecular clock," IEEE J. Solid-State Circuits, vol. 54, No. 4, pp. 914-926, Apr. 2019.

X. Yi, C. Wang, X. Chen, J. Wang, J. Grajal and R. Han, "A 220-to-320-GHz FMCW radar in 65-nm CMOS using a frequency-comb architecture," IEEE J. Solid-State Circuits, vol. 56, No. 2, pp. 327-339, Feb. 2021.

A. Mostajeran et al., "A high-resolution 220-GHz ultra-wideband fully integrated ISAR imaging system," IEEE Trans. Microw. Theory Techn., vol. 67, No. 1, pp. 329-339, 2019.

(Continued)

*Primary Examiner* — Jany Richardson
(74) *Attorney, Agent, or Firm* — Renner, Kenner, Greive, Bobak, Taylor & Weber

(57) ABSTRACT

A radiator for terahertz electromagnetic radiation. The radiator includes one or more radiator units. Each radiator unit includes an oscillator operable to generate second harmonic power, and a patch antenna operably coupled with the oscillator for radiating terahertz electromagnetic radiation based on the generated second harmonic power.

28 Claims, 20 Drawing Sheets

(56) References Cited

OTHER PUBLICATIONS

D. Simic, K. Guo and p. Reynaert, "A 0.42 THz coherent TX-RX system achieving 10dBm EIRP and 27dB NF in 40nm CMOS for phase-contrast imaging," in IEEE Int. Solid-State Circuits Conf. (ISSCC) Dig. Tech. Papers, San Francisco, CA, USA, Feb. 2021, pp. 318-320.
U. R. Pfeiffer et al., "A 0.53 THz reconfigurable source module with up to 1 mW radiated power for diffuse illumination in terahertz imaging applications," IEEE J. Solid-State Circuits, vol. 49, No. 12, pp. 2938-2950, Dec. 2014.
R. Jain et. al., "A 64-pixel 0.42-THz source SoC with spatial modulation diversity for computational imaging," IEEE J. Solid-State Circuits, vol. 55, No. 12, pp. 3281-3293, Dec. 2020.
H. Saeidi, S. Venkatesh, X. Lu and K. Sengupta, "THz prism: One-shot simultaneous multi-node angular localization using spectrum-to-space mapping with 360-to-400 GHz broadband transceiver and dual-port integrated leaky-wave antennas," in IEEE Int. Solid-State Circuits Conf. (ISSCC) Dig. Tech. Papers, San Francisco, CA, USA, Feb. 2021, pp. 314-316.
Z. Wang, P. Chiang, P. Nazari, C. Wang, Z. Chen and p. Heydari, "A CMOS 210-GHz fundamental transceiver with OOK modulation," IEEE J. Solid-State Circuits, vol. 49, No. 3, pp. 564-580, Mar. 2014.
J. W. Holloway, G. C. Dogiamis, and R. Han, "A 105 GB/s dielectric waveguide link in 130 nm BiCMOS using channelized 220-to-335 GHz signal and integrated waveguide coupler," in IEEE Int. Solid-State Circuits Conf. (ISSCC) Dig. Tech. Papers, Feb. 2021, pp. 196-198.
S. Lee et al., "An 80-GB/s 300-GHz-band single-chip CMOS transceiver," IEEE J. Solid-State Circuits, vol. 54, No. 12, pp. 3577-3588, Dec. 2019.
M. I. W. Khan et al., "CMOS THz-ID: A 1.6-mm2 package-less identification tag using asymmetric cryptography and 260-GHz far-field backscatter communication," IEEE J. Solid-State Circuits, vol. 56, No. 2, pp. 340-354, Feb. 2021.
E. Seok et al., "A 410GHz CMOS push-push oscillator with an on-chip patch antenna," in IEEE Int. Solid-State Circuits Conf. (ISSCC) Dig. Tech. Papers, San Francisco, CA, USA, Feb. 2008, pp. 472-629.
K. Guo, A. Standaert, and P. Reynaert, "A 525-556-GHz radiating source with a dielectric lens antenna in 28-nm CMOS," IEEE Trans. THz Sci. Technol., vol. 8, No. 3, pp. 340-349, May 2018.
W. Steyaert and P. Reynaert, "A 0.54 THz signal generator in 40 nm bulk CMOS with 22 GHz tuning range and integrated planar antenna," IEEE J. Solid-State Circuits, vol. 49, No. 7, pp. 1617-1626, Jul. 2014.
P. Nazari, S. Jafarlou, and P. Heydari, "Analysis and design of a millimeter-wave cavity-backed circularly polarized radiator based on fundamental theory of multi-port oscillators," IEEE J. Solid-State Circuits, vol. 52, No. 12, pp. 3293-3311, Dec. 2017.
B. Khamaisi, S. Jameson, and E. Socher, "0.61 THz radiating source with on-chip antenna on 65 nm CMOS," in Proc. 11th Eur. Microw. Integr. Circuits Conf., London, U.K., Oct. 2016, pp. 389-392.
H. Saeidi, S. Venkatesh, C. R. Chappidi, T. Sharma, C. Zhu, and K. Sengupta, "A 4×4 distributed multi-layer oscillator network for harmonic injection and THz beamforming with 14dBm EIRP at 416GHz in a lens less 65nm CMOS IC," in IEEE Int. Solid-State Circuits Conf. (ISSCC) Dig. Tech. Papers, San Francisco, CA, USA, Feb. 2020, pp. 256-258.
L. Gao, H. Zhou, K. M. Shum, and C. H. Chan, "A 482-GHz 2-D scalable and wideband radiator array," IEEE Microw. Wirel. Compon. Lett., vol. 31, No. 9, pp. 1090-1093, Sep. 2021.
Y. Tousi and E. Afshari, "A high-power and scalable 2-D phased array for terahertz CMOS integrated systems," IEEE J. Solid-State Circuits, vol. 50, No. 2, pp. 597-609, Feb. 2015.
H. Jalili and O. Momeni, "A standing-wave architecture for scalable and wideband millimeter-wave and terahertz coherent radiator arrays," IEEE Trans. Microw. Theory Techn., vol. 66, No. 3, pp. 1597-1609, Mar. 2018.
H. Jalili and O. Momeni, "A 0.34-THz wideband wide-angle 2-D steering phased array in 0.13-μm SiGe BiCMOS," IEEE J. Solid-State Circuits, vol. 54, No. 9, pp. 2449-2461, Sep. 2019.
L. Gao and C. H. Chan, "A 0.45-THz 2-D scalable radiator array with 28.2-dBm EIRP using an elliptical Teflon lens," IEEE J. Solid-State Circuits, vol. 57, No. 2, pp. 400-412, Feb. 2022.
H. Jalili and O. Momeni, "A 0.46-THz 25-element scalable and wideband radiator array with optimized lens integration in 65-nm CMOS," IEEE J. Solid-State Circuits, vol. 55, No. 9, pp. 2387-2400, Sep. 2020.
Y. Zhao et al., "A 0.54-0.55 THz 2×4 coherent source array with EIRP of 24.4 dBm in 65nm CMOS technology," in IEEE MTT-S Int. Microw. Symp. Dig., Phoenix, AZ, USA, May 2015, pp. 1-3.
K. Guo and P. Reynaert, "A 0.59THz beam-steerable coherent radiator array with 1mW radiated power and 24.1dBm EIRP in 40nm CMOS," in IEEE Int. Solid-State Circuits Conf. (ISSCC) Dig. Tech. Papers, San Francisco, CA, USA, Feb. 2020, pp. 442-444.
G. Guimaraes and P. Reynaert, "A 670-GHz 4 × 2 oscillator-radiator Array Achieving 7.4-dBm EIRP in 40-nm CMOS," IEEE J. Solid-State Circuits, vol. 56, No. 11, pp. 3399-3411, Nov. 2021.
N. Buadana, S. Jameson, and E. Socher, "A multiport chip-scale dielectric resonator antenna for CMOS THz transmitters," IEEE Trans. Microw. Theory Techn., vol. 68, No. 9, pp. 3621-3632, Sep. 2020.
Z. Hu, M. Kaynak, and R. Han, "High-power radiation at 1 THz in silicon: A fully scalable array using a multi-functional radiating mesh structure," IEEE J. Solid-State Circuits, vol. 53, No. 5, pp. 1313-1327, May 2018.
R. Han et al., "A SiGe terahertz heterodyne imaging transmitter with 3.3 mW radiated power and fully-integrated phase-locked loop," IEEE J. Solid-State Circuits, vol. 50, No. 12, pp. 2935-2947, Dec. 2015.
M. Adnan and E. Afshari, "A 247-to-263.5 GHz VCO with 2.6 mW peak output power and 1.14% DC-to-RF efficiency in 65 nm bulk CMOS," in IEEE Int. Solid-State Circuits Conf. (ISSCC) Dig. Tech. Papers, Feb. 2014, pp. 262-263.
Y. M. Tousi, O. Momeni and E. Afshari, "A novel CMOS high-power terahertz VCO based on coupled oscillators: theory and implementation," IEEE J. Solid-State Circuits, vol. 47, No. 12, pp. 3032-3042, Dec. 2012.
H. Jalili and O. Momeni, "A 230-GHz high-power and wideband coupled standing wave VCO in 65-nm CMOS," IEEE J. Solid-State Circuits, vol. 55, No. 3, pp. 547-556, Mar. 2020.
R. Kananizadeh and O. Momeni, "High-power and high-efficiency millimeter-wave harmonic oscillator design, exploiting harmonic positive feedback in CMOS," IEEE Trans. Microw. Theory Techn, vol. 65, No. 10, pp. 3922-3936, Oct. 2017.
R. Kananizadeh and O. Momeni, "Second-harmonic power generation limits in harmonic oscillators," IEEE J. Solid-State Circuits, vol. 53, No. 11, pp. 3217-3231, Nov. 2018.
J. M. Edwards and G. M. Rebeiz, "High-efficiency elliptical slot antennas with quartz superstrates for silicon RFICs," IEEE Trans. Antennas Propag., vol. 60, No. 11, pp. 5010-5020, Nov. 2012.
O. Momeni and E. Afshari, "High power terahertz and millimeter-wave oscillator design: a systematic approach," IEEE J. Solid-State Circuits, vol. 46, No. 3, pp. 583-597, Mar. 2011.
R. Han and E. Afshari, "A CMOS high-power broadband 260-GHz radiator array for spectroscopy," IEEE J. Solid-State Circuits, vol. 48, No. 12, pp. 3090-3104, Dec. 2013.
H. Wang, J. Chen, J. T. S. Do, H. Rashtian, and X. Liu, "High-efficiency millimeter-wave single-ended and differential fundamental oscillators in CMOS," IEEE J. Solid-State Circuits, vol. 53, No. 8, pp. 2151-2163, Aug. 2018.
J. Chen, H. Wang, and X. Liu, "A 310-GHz fundamental oscillator with 0.4-mW output power and 3.2% dc-to-RF efficiency in 65-nm CMOS," in Proc. IEEE 20th Wireless Microw. Technol. Conf. (WAMICON), Apr. 2019, pp. 1-4.
R. Waterhouse, "Small microstrip patch antenna," Electron. Lett., vol. 31, No. 8, pp. 604-605, Apr. 1995.
S. Pinhas and S. Shtrikman, "Comparison between computed and measured bandwidth of quarter-wave microstrip radiators," IEEE Trans. Antennas Propag., vol. 36, No. 11, pp. 1615-1616, Nov. 1988.

(56) References Cited

OTHER PUBLICATIONS

A. K. Shackelford, K.-F. Lee and K. M. Luk, "Design of small-size wide-bandwidth microstrip-patch antennas," IEEE Antennas Propag. Mag., vol. 45, No. 1, pp. 75-83, Feb. 2003.
R. Chair, C.-L. Mak, K.-F. Lee, K.-M. Luk, and A. A. Kishk, "Miniature wide-band half U-slot and half E-shaped patch antennas," IEEE Trans. Antennas Propag., vol. 53, No. 8, pp. 2645-2652, Aug. 2005.

* cited by examiner

RADIATOR FOR TERAHERTZ ELECTROMAGNETIC RADIATION

TECHNICAL FIELD

The invention relates to generation and radiation of terahertz (THz) electromagnetic radiation.

BACKGROUND

Electromagnetic radiation at the terahertz frequency band can potentially be used in various applications such as sensing and communication. One existing means for generating electromagnetic radiation at the terahertz frequency band is silicon-based terahertz integrated circuit (IC). The power of terahertz signal generated by such integrated circuit may not be sufficient for some applications.

SUMMARY OF THE INVENTION

In a first aspect, there is provided a radiator for terahertz electromagnetic radiation (signals). The radiator comprises one or more radiator units each including: an oscillator operable to generate second harmonic power; and a patch antenna operably coupled with the oscillator for radiating terahertz electromagnetic radiation based on the generated second harmonic power.

In one example, the terahertz electromagnetic radiation is at least 0.1 THz. In one example, the terahertz electromagnetic radiation is from about 0.1 THz to about 10 THz. In one example, the terahertz electromagnetic radiation is from about 0.2 THz to about 5 THz. In one example, the terahertz electromagnetic radiation is from about 0.3 THz to about 3 THz. In one example, the terahertz electromagnetic radiation is from about 0.3 THz to about 1 THz. In one example, the terahertz electromagnetic radiation is from about 0.4 THz to about 0.5 THz.

Optionally, the oscillator comprises a transistor. The transistor may be a field effect transistor (FET), e.g., JFET, MOSFET (PMOS, NMOS, CMOS, etc.), etc. The transistor may be a bipolar junction transistor (BJT), e.g., a heterojunction bipolar transistor. The oscillator may include one or more transistors.

Optionally, the transistor is configured and/or controlled to operate in an active region and/or a triode region for facilitating generation of the second harmonic power.

Optionally, the transistor is configured and/or controlled to optimize a (net) fundamental output power of the transistor and a second harmonic output power of the transistor.

Optionally, the oscillator comprises a differential oscillator.

Optionally, the differential oscillator comprises: a first transistor, a second transistor, and a transmission line network connecting the first transistor and the second transistor. Optionally, the first transistor may be a field effect transistor (FET), e.g., JFET, MOSFET (PMOS, NMOS, CMOS, etc.), etc. The transistor may be a bipolar junction transistor (BJT), e.g., a heterojunction bipolar transistor. Optionally, the second transistor may be a field effect transistor (FET), e.g., JFET, MOSFET (PMOS, NMOS, CMOS, etc.), etc. The transistor may be a bipolar junction transistor (BJT), e.g., a heterojunction bipolar transistor. The first and second transistors may or may not be the same type of transistor.

Optionally, the first transistor and the second transistor are each configured and/or controlled to operate in an active region and/or a triode region for facilitating generation of the second harmonic power.

Optionally, the first transistor is configured and/or controlled to optimize a (net) fundamental output power of the first transistor and a second harmonic output power of the first transistor.

Optionally, the second transistor is configured and/or controlled to optimize a (net) fundamental output power of the second transistor and a second harmonic output power of the second transistor.

Optionally, the transmission line network comprises a first transmission line portion operable as a second harmonic load for facilitating extraction of the second harmonic power. Preferably, an impedance of the second harmonic load and an input impedance of the patch antenna are substantially matched (e.g., the same).

Optionally, the first transmission line portion is connected between a drain terminal of the first transistor and a drain terminal of the second transistor.

Optionally, the transmission line network further comprises: a second transmission line portion connected between a gate terminal of the first transistor and a gate terminal of the second transistor and operable as a gate inductor of the first transistor and a gate inductor of the second transistor. Optionally, the transmission line network further comprises: a third transmission line portion connected between a drain terminal of the first transistor and a drain terminal of the second transistor and operable as a drain inductor of the first transistor and a drain inductor of the second transistor. Optionally, the transmission line network further comprises: a fourth transmission line portion connected to a source terminal of the first transistor and operable as a source inductor of the first transistor. Optionally, the transmission line network further comprises: a fifth transmission line portion connected to a source terminal of the second transistor and operable as a source inductor of the second transistor.

Optionally, the second transmission line portion is not straight (e.g., is curved, has one or more L-shaped portions, etc.). Optionally, the third transmission line portion is not straight (e.g., is curved, has one or more L-shaped portions, etc.). Optionally, the fourth transmission line portion is not straight (e.g., is curved, has one or more L-shaped portions, etc.). Optionally, the fifth transmission line portion is not straight (e.g., is curved, has one or more L-shaped portions, etc.).

Optionally, the first transmission line portion is connected with the third transmission line portion. Optionally, the first transmission line portion is connected with the third transmission line portion at a middle or center part of the first transmission line portion.

Optionally, the differential oscillator further comprises: a first capacitive circuit connected to source terminal of the first transistor; and a second capacitive circuit connected to source terminal of the second transistor. The first capacitive circuit may comprise or consist of one or more capacitors. The second capacitive circuit may comprise or consist of one or more capacitors.

Optionally, the patch antenna is an on-chip patch antenna comprising a patch element arranged on a metal layer of a substrate. The metal layer may be arranged on one side (e.g., top side) of the substrate and the substrate may have more than one metal layer.

Optionally, the patch element of each of the one or more radiator units is arranged on the metal layer. The metal layer may include a continuous layer or multiple separate metal portions (e.g., each for a respective patch element). The patch antenna may be a miniature patch antenna, i.e., the length and/or width (in plan view) of the patch element may be smaller than conventional patch antenna. As an example, the length and/or width (in plan view) of the patch element of the miniature patch antenna may be in the order of micrometers (ones, tens, or hundreds of micrometers).

Optionally, the oscillator of each of the one or more radiator units is arranged at least partly on the metal layer. In some examples, the oscillator of each of the one or more radiator units is arranged on multiple metal layers of the substrate.

Optionally, the patch element is directly connected with the oscillator.

Optionally, the on-chip patch antenna comprises a shorting arrangement arranged on a side of the patch element close or closest to the oscillator. Optionally, the shorting arrangement comprises one or more shorting walls or pins. Optionally, the shorting walls or pins comprise vias walls or pins.

Optionally, the patch element further comprises one or more slots that open at the side with the shorting arrangement. Optionally, the one or more slots comprises a pair of elongated slots arranged generally in parallel. Optionally, the pair of elongated slots has substantially the same length. Optionally, the patch element is substantially symmetric about at least one axis of symmetry. Optionally, a length of the pair of elongated slots and a spacing between the pair of elongated slots are arranged such that an input impedance of the patch antenna is substantially matched to an impedance of the second harmonic load.

Optionally, the one or more radiator units comprises a plurality of radiator units, and the radiator further comprises a coupling arrangement operably coupling the plurality of radiator units. The plurality of radiator units are thus coupled radiator units.

Optionally, the coupling arrangement comprises a coupling transmission line network for electrically connecting the plurality of radiator units.

Optionally, the plurality of radiator units are arranged in an array, e.g., in row(s) and column(s). The plurality of radiator units may be arranged in a regular array or an irregular array. In one example, the plurality of radiator units are arranged in N row(s) and M column(s) and the total number of radiator units is N×M (N, M are integers, and N×M is at least 2).

Optionally, the coupling transmission line network are arranged to electrically connect the plurality of radiator units in series and in an endless loop (e.g., "ring").

Optionally, the coupling transmission line network are arranged to couple adjacent radiator units out-of-phase at fundamental frequency.

Optionally, the coupling transmission line network comprises, for each respective one of the plurality of radiator units: a first coupling transmission line connecting with an adjacent radiator unit; and a second coupling transmission line connecting with another adjacent radiator unit. Optionally, the first coupling transmission line is connected with the gate terminal of the first transistor and the second coupling transmission line is connected with the gate terminal of the second transistor. The first coupling transmission line may be operable as a gate inductor of the first transistor. The second coupling transmission line may be operable as a gate inductor of the second transistor.

Optionally, the differential oscillator of each respective one of the plurality of radiator units further comprises: an even-mode suppression circuit.

Optionally, the even-mode suppression circuit comprises one or more or all of: a first capacitive circuit connected to the first coupling transmission line; a second capacitive circuit connected to the second coupling transmission line; and a third capacitive circuit connected to the second transmission line portion. These capacitive circuits are arranged to electrically short the even-mode signals. These capacitive circuits may each comprise or consist of one or more capacitors.

Optionally, the radiator is fabricated using CMOS technologies, such as 65 nm CMOS process/technology. Optionally, the radiator is fabricated using other technologies such as SiGe technologies.

Optionally, the radiator is arranged in, or formed in, an integrated circuit (chip).

Optionally, the radiator is terahertz radiator configured for terahertz electromagnetic radiation only. Optionally, the radiator is configured for terahertz electromagnetic radiation as well as electromagnetic radiation at one or more other frequencies or frequency bands.

In a second aspect, there is provided a device arranged to radiate terahertz electromagnetic radiation, comprising: a radiator of the first aspect.

Optionally, the device further comprises a lens generally aligned with the one or more radiator units of the radiator, or more specifically, a phase center of the radiator (for radiator with multiple radiator units arranged in an array, a phase center of the array), for affecting directivity of the terahertz electromagnetic radiation. The lens may be a polytetrafluoroethylene (PTFE) lens, a dielectric lens, etc. The lens may comprise a curved boundary surface, such as a convex boundary surface or a concave boundary surface. In one example, the lens comprises an ellipsoidal or part-ellipsoidal (e.g., truncated ellipsoidal) boundary surface.

Optionally, the device further comprises a superstrate attached to the one or more radiator units of the radiator. Optionally, the superstrate comprises quartz superstrate. The superstrate covers and/or shields the one or more radiator units of the radiator.

Optionally, the radiator is arranged in an integrated circuit (chip). Optionally, the device further comprises a PCB substrate, the integrated circuit (chip) is arranged on one face of the PCB substrate and a ground plane is arranged on an opposite face of the PCB substrate.

Optionally, the device further comprises a support structure supporting the lens above the integrated circuit (chip). The support structure may be additively manufactured.

Optionally, the integrated circuit (chip) is placed at or near a focus on the lens. In one example the lens includes a truncated ellipsoidal boundary surface and the integrated circuit (chip) is placed at or near a focus of the ellipse associated with the truncated ellipsoidal boundary surface.

In a third aspect, there is provided a system arranged to generate and radiate terahertz electromagnetic radiation (signals), comprising one or more of the radiators of the first aspect. The system may be a sensing system, a communication system, a spectroscopic system, an imaging system, etc. In one example, the system is an active terahertz imaging system arranged to illuminate objections (e.g., targeted objects). In one example, the system is a cellular (e.g., 5G, 6G, or above) communication system.

In a fourth aspect, there is provided a system arranged to generate and radiate terahertz electromagnetic radiation (signals), comprising one or more of the devices of the second aspect. The system may be a sensing system, a communication system, a spectroscopic system, an imaging system, etc. In one example, the system is an active terahertz imaging system arranged to illuminate objections (e.g., targeted objects). In one example, the system is a cellular (e.g., 5G, 6G, or above) communication system.

In a fifth aspect, there is provided an integrated circuit (chip) comprising one or more of the radiators of the first aspect. The radiation radiates from one side (e.g., the front side) of the integrated circuit (chip).

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are, depending on context, used to take into account manufacture tolerance, wearing, degradation, trend, tendency, etc.

BRIEF DESCRIPTION OF THE DRAWINGS

Embodiments of the invention will now be described, by way of example, with reference to the accompanying drawings in which.

DETAILED DESCRIPTION

Figure 1A:
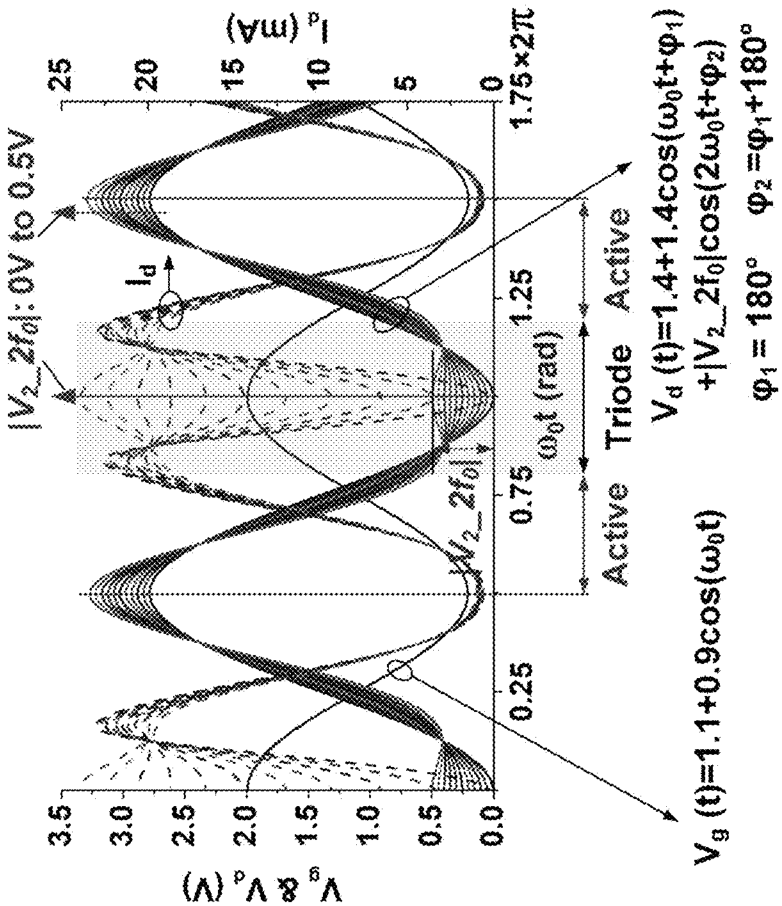
FIG. 1A is a graph showing simulated drain current waveforms of a transistor (l/w=60 nm/16 μm, at 1 GHz) under different voltage waveforms by varying the second-harmonic voltage amplitude at the drain terminal in one embodiment.

The inventors of the invention have devised, through research, experiments, and/or trials, that THz signal generation in silicon-based technology is often limited in power (e.g., cannot provide high-power) and this impedes the design and fabrication of a high-performance silicon-based THz systems. The inventors of the invention have realized that power radiated from a single radiator element is generally limited, and that a scalable coupled oscillator-radiator array architecture can be used for high-power coherent THz signal generation and radiation, as such architecture can efficiently and coherently combine the radiated signals from each unit in the space. The inventors of the invention have realized that as the array size increases, the radiated power increases, the beam can become narrower, and the effective isotropic radiated power (EIRP) can be improved.

Inventors of the invention have further devised, through research, experiments, and/or trials, that several issues need to be considered for a high-performance THz scalable coupled harmonic oscillator-based radiator array in silicon. First, the efficiency of the harmonic oscillator core should be high or improved. For THz generation beyond $f_{max}$ in silicon, the dc-to-THz efficiency is small (e.g., <1%), so boosting harmonic power generation efficiency can reduce the DC power consumption. Second, while the output power of a scalable array can be improved by increasing array size, i.e., the high output power is achieved for the scalable architecture by sacrificing the chip area, compact designs are preferred in some applications. Third, since the size of the on-chip antenna is generally larger than the active circuit, the slot antenna can be used in place of on-chip antenna. However, the use of slot antenna with back-side radiation often requires silicon lens, which can be expensive, and even if the silicon lens is replaced with a less expensive polytetrafluoroethylene (PTFE) lens, heat dissipation could still be problematic for a large-scale array using slot antennas, considering the low dc-to-THz conversion efficiency. Using on-chip patch antennas may solve one or more of these problems, but it could increase the size of the radiator, which potentially impedes element coupling and limits scalability. Therefore, the size of the on-chip patch antenna needs to be controlled.

R. Kananizadeh and O. Momeni, "*High-power and high-efficiency millimeter-wave harmonic oscillator design, exploiting harmonic positive feedback in CMOS,*" *IEEE Trans. Microw. Theory Techn*, vol. 65, no. 10, pp. 3922-3936, October 2017 and R. Kananizadeh and O. Momeni, "*Second-harmonic power generation limits in harmonic oscillators,*" *IEEE J. Solid-State Circuits*, vol. 53, no. 11, pp. 3217-3231, November 2018 are studies that investigate high-efficiency harmonic oscillator by exploiting the harmonic positive feedback phenomenon. Based on the teachings in these two Kananizadeh publications, the inventors of the invention have realized that as the $f_{osc}/f_{max}$ ratio increases, the net fundamental output power from a transistor decreases, and the loss in passive components increases (both makes it difficult to realize optimum waveform for maximum harmonic power generation). The inventors of the invention have realized that a quantitative trade-off between fundamental oscillation and harmonic output power may be necessary to achieve a high second-harmonic output power at a high $f_{osc}/f_{max}$ ratio. The following disclosure provides an example design methodology for synthesizing an oscillator with high second-harmonic power generation taking this trade-off into account.

An overview of the high second-harmonic power generation principle in a harmonic oscillator proposed in the above two Kananizadeh publications is now presented. Even though the optimum waveform is obtained for maximum second-harmonic output power, it is impossible to satisfy the optimum condition for an oscillator with a high $f_{osc}/f_{max}$ ratio. This is because the optimum waveform for maximum second-harmonic output power in Kananizadeh may lead to very low net fundamental output power, which may not be sufficient to compensate for the loss in the embedding network, especially at a high $f_{osc}/f_{max}$ ratio. Therefore, the trade-off between the fundamental output power and harmonic output power from a transistor should be considered. The following disclosure will provide examples to quantify the trade-off and to determine a proper design condition for high fundamental output power and high second-harmonic power simultaneously. Based on the determined condition, the oscillator is synthesized by considering the finite quality factor of the components so that the designed oscillator can oscillate and provide high second-harmonic power at a high $f_{osc}/f_{max}$ ratio. In addition to maximizing the second-harmonic power generation, high-efficiency power extraction (not discussed in the above two Kananizadeh publications) is also relevant. The following disclosure discloses in some examples the effects of the second-harmonic load impedance on the extraction efficiency.

The inventors of the invention have realized that the triode region of a transistor is generally the source of large second-harmonic current. Therefore, the transistor should operate in or between the active and triode regions and avoid the cut-off region because the second-harmonic current generated from the cut-off region is out of phase with and hence cancel out the second-harmonic current generated from the triode region. Therefore, the choice of the bias voltage $V_G$ and fundamental voltage amplitude of $V_1$ at the gate should avoid the cut-off region. FIG. 1A shows simulated drain current waveforms of a transistor (l/w=60 nm/16 μm, at 1 GHz) under different voltage waveforms by varying the second-harmonic voltage amplitude (from 0 V to 0.5 V) at the drain terminal in one embodiment. In this example, the bias voltage $V_G$, supply voltage $V_D$, the fundamental AC voltages $V_1$ and $V_2$ at gate and drain terminals determine the depth of the triode region of the transistor. In this example, the maximum gate voltage level $V_{Max\_G}$ is assumed to be 2 V for the voltage swing at the gate, and the threshold voltage $V_{TH}$ is set to be 0.2 V. Also, the bias voltage $V_G$ and fundamental voltage amplitude of $V_1$ are set to be 1.1 V and 0.9 V to maximize the generated current at the drain terminal. Lower supply voltage $V_D$ and larger $|V_2|$ will lead to a deeper triode region for the voltage waveform at the drain terminal. For the simulated waveforms in FIG. 1A, $V_D$=1.4 V and $|V_2|$=1.4 V are applied.

Figure 1B:
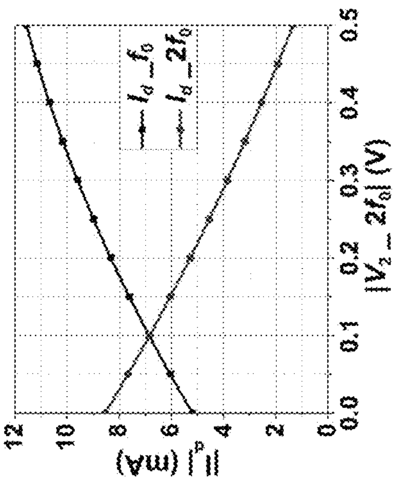
FIG. 1B is a graph showing magnitudes of output fundamental and second-harmonic drain current with different second-harmonic voltages.
Figure 1C:
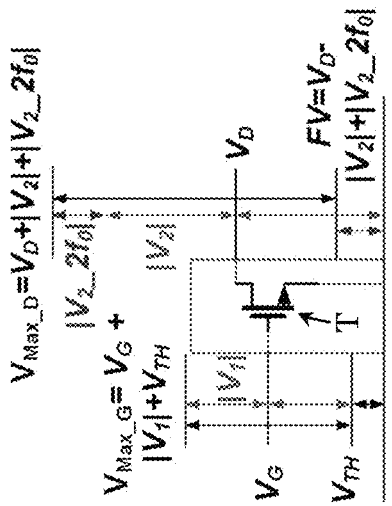
FIG. 1C is a schematic diagram illustrating various voltage relationship applied to a transistor in one embodiment.

When the transistor enters the triode region, the harmonic current will be boosted as the drain current waveforms (e.g., $|V_{2}\_2f_o|$=0 V), as shown in FIG. 1A. However, when the transistor enters the deep triode region, the fundamental current is reduced, which leads to lower fundamental output power. The inventors of the invention have discovered, through research, experiments, and/or trials, that a proper second-harmonic voltage (180° phase difference to the fundamental voltage) applied at the drain terminal can alter the drain voltage waveform and control the depth of the triode region. Therefore, the current waveform at the drain terminal can be controlled by $|V_2\_2f_o|$ as shown in FIG. 1A. As $|V_2\_2f_o|$ increases, the current waveform becomes more sinusoidal, indicating that the fundamental current content is increased. FIG. 1B shows the magnitudes of output fundamental and second-harmonic drain current with different second-harmonic voltages and the results verify the observation. As $|V_2\_2f_o|$ increases, the fundamental currents increase, which lead to the harmonic positive feedback phenomenon in the oscillator. This phenomenon can be explained as follows. For an oscillator with proper fundamental and second-harmonic loadings at the drain terminal, as the second-harmonic voltage at the drain terminal increases, the fundamental current is boosted. This will increase the fundamental voltage at the drain terminal, which will improve the second-harmonic current. However, the increase of $|V_2\_2f_o|$ will also reduce the second-harmonic current, as shown in FIG. 1B. Therefore, the positive feedback will stop at a proper second-harmonic voltage. FIG. 1C shows the voltage relationship applied to a transistor T. In some embodiments, the transistor T may be a field effect transistor (FET), e.g., JFET, MOSFET (PMOS, NMOS, CMOS, etc.), etc. In some embodiments, the transistor T may be a bipolar junction transistor (BJT), e.g., a heterojunction bipolar transistor.

A procedure to determine the condition for a high second-harmonic power generation with sufficient net fundamental output power from a transistor at a high $f_{osc}/f_{max}$ ratio is now described.

Figure 2B:
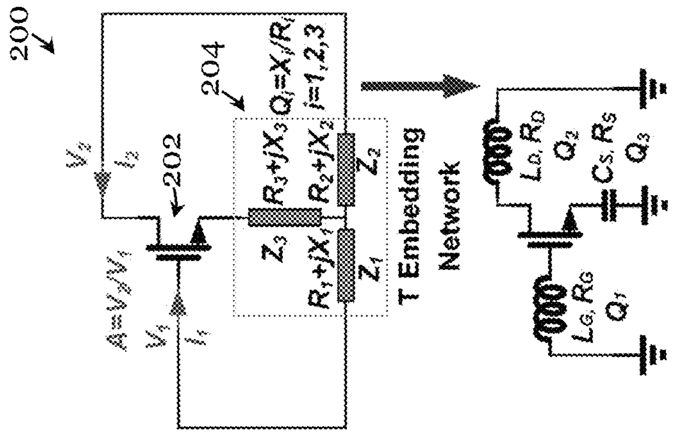
FIG. 2B is a schematic diagram of a T-embedding type oscillator synthesized based on the setup of FIG. 2A in one embodiment.
Figure 2A:
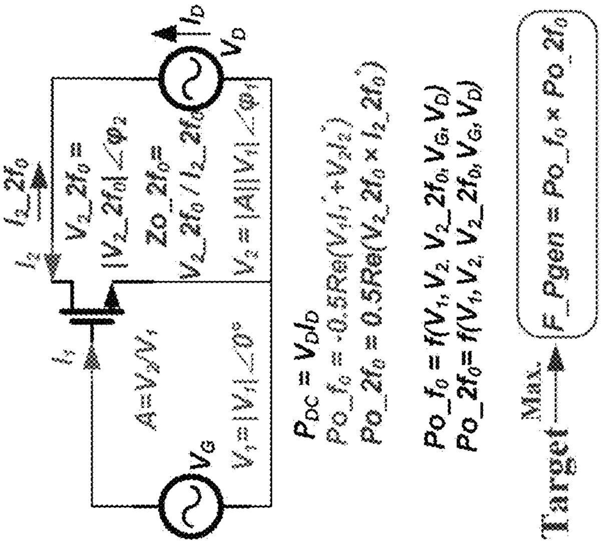
FIG. 2A is a schematic diagram of a simulation setup for synthesizing a high output power harmonic oscillator in one embodiment.

FIG. 2A shows a simulation setup for synthesizing a high output power harmonic oscillator in one embodiment. In this embodiment, the simulation setup is used to directly obtain the optimum condition. By applying the fundamental excitation voltages $V_1$ and $V_2$ at the gate and drain terminals respectively to make the transistor operate as an active device, the net fundamental output power $Po\_f_o$ will come out from the transistor and is calculated as shown in FIG. 2A. Higher-order harmonic currents will also flow out from the drain terminal. In this design, the signal of interest is the second harmonic. The second-harmonic voltage $V_2\_2f_o$ is also applied at the drain terminal; other higher-order harmonic currents are shorted to the ground. This approach is reasonable because the third harmonic (the strongest higher-order harmonic) current can be suppressed with $V_2\_2f_o$. The generated second-harmonic power from drain terminal $Po\_2f_o$ can be calculated as shown in FIG. 2A. As mentioned, the net fundamental output power $Po\_f_o$ and the second-harmonic output power $Po\_2f_o$ of a transistor are functions of $V_1$, $V_2$, $V_2\_2f_o$, $V_G$, and $V_D$. To determine the final optimum state, instead of solely maximizing $Po\_f_o$ or $Po\_2f_o$, this embodiment considers both factors at the same time so that the designed oscillator can sustain oscillation at a high $f_{osc}/f_{max}$ ratio and provide high output second-harmonic power. As the conditions for maximum $Po\_f_o$ and maximum $Po\_2f_o$ are different, a factor F_Pgen, the product of $Po\_f_o$ and $Po\_2f_o$, is defined as a trade-off. In this embodiment, the condition for maximum F_Pgen implies that high $Po\_f_o$ and high $Po\_2f_o$ are achieved simultaneously, and the extreme cases, e.g., very small $Po\_f_o$ or $Po\_2f_o$, can be filtered or discarded. To find the condition for maximum F_Pgen, it would be necessary to sweep at least some of the variables to seek a maximum F_Pgen. As mentioned, some of the variables can be predetermined. For example, $V_G$ and $|V_1|$ can be determined for maximum voltage swing at the gate to maximize the generated current at the drain terminal once $V_{max\_G}$ and $V_{TH}$ are known. The phase difference between $\varphi_2$ and $\varphi_1$ is also fixed (180°), as shown in FIG. 1A. At low frequency, $\varphi_1$ is 180°, but at high frequency, the fundamental current feedthrough from gate terminal to drain terminal is significant, and the optimum $\varphi_1$ deviates from 180°. Therefore, $\varphi_1$ can be determined first.

FIG. 2B shows a T-embedding type oscillator 200 synthesized based on the setup of FIG. 2A and the determined condition in one embodiment. The T-embedding type oscillator 200 includes a transistor 202 and a T-embedding network 204.

Figure 2C:
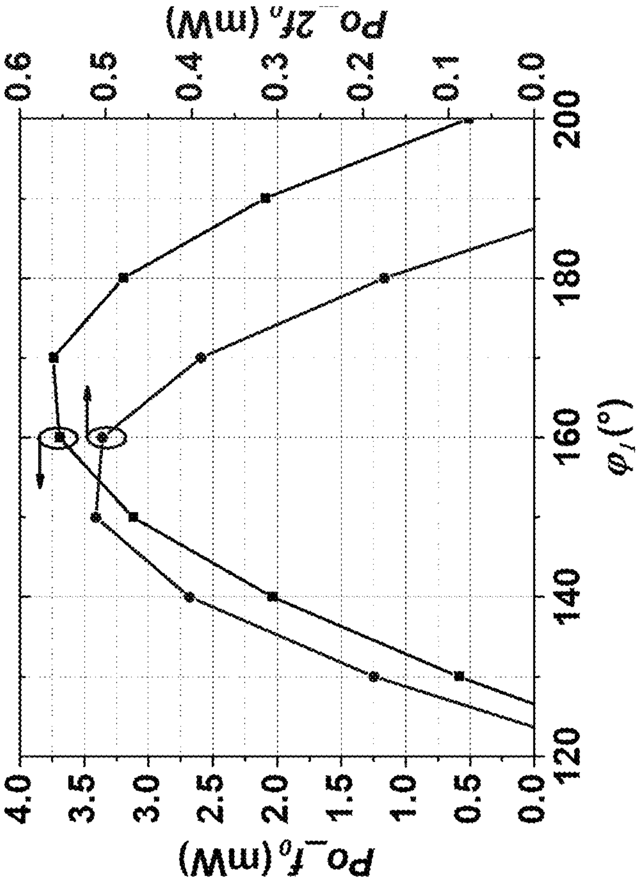
FIG. 2C is a graph showing fundamental output power and second-harmonic output power for different $\varphi_1$ (when $f_o$=235 GHz, $V_G$=1.1 V, $V_D$=1.4 V, $|V_1|$=0.9 V, $|V_2|$=1.3 V, $\varphi_2$=340°, $|V_2\_2f_o|$=0.28 V)

FIG. 2C shows the simulated $Po\_f_o$ and $Po\_2f_o$ by sweeping $\varphi_1$, and the optimum value is around 160° to simultaneously maximize the net fundamental and second-harmonic output power.

Based on the above, in this example, the predetermined parameters are $V_G$=1.1 V, $|V_1|$=0.9 V, $\varphi_1$=160°, $\varphi_2$=340° and $|V_2|$, $|V_2\_2f_o|$ and $V_D$ are not determined. Therefore, in this example, these variables are swept to obtain the maximum F_Pgen.

Figure 3C:
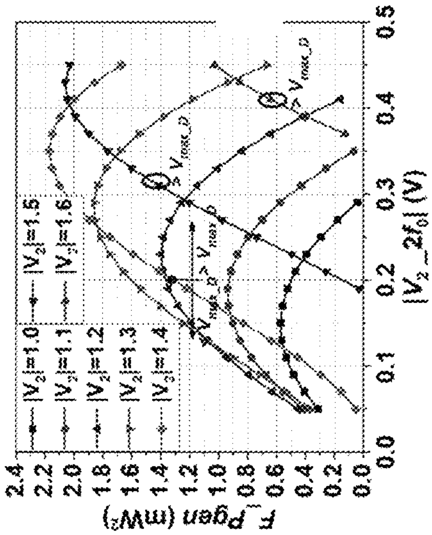
FIG. 3C is a graph showing simulated power factor (defined by the fundamental output power times the second-harmonic output power) for different $|V_2|$ (1.0 V-1.6 V) and $|V_2\_f_o|$, under $V_G$=1.1V, $V_D$=1.4 V.
Figure 3B:
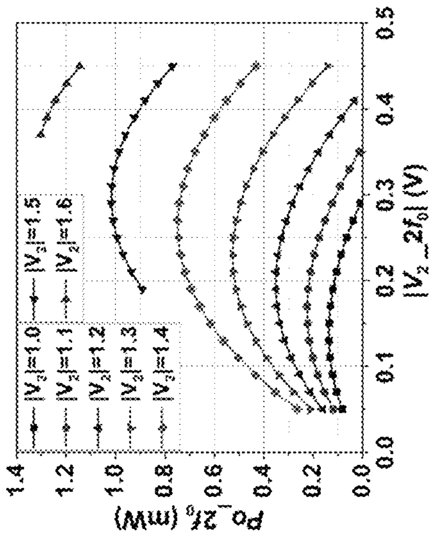
FIG. 3B is a graph showing simulated second-harmonic output power for different $|V_2|$ (1.0 V-1.6 V) and $|V_2\_f_o|$, under $V_G$=1.1V, $V_D$=1.4 V.
Figure 3A:
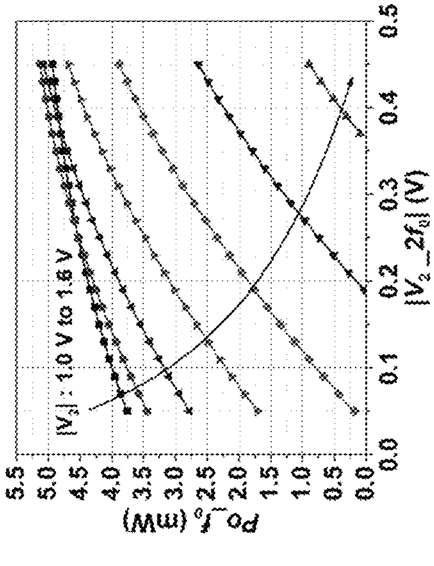
FIG. 3A is a graph showing simulated fundamental output power for different $|V_2|$ (1.0 V-1.6 V) and $|V_2\_f_o|$, under $V_G$=1.1 V, $V_D$=1.4 V.

FIGS. 3A, 3B, and 3C show the simulated fundamental output power $Po\_f_o$, simulated second-harmonic output power $Po\_2f_o$, and simulated power factor F_Pgen, respectively, for various $|V_2|$ and $|V_2\_2f_o|$ under $V_D$=1.4 V. It is noted that $Po\_f_o$ and $Po\_2f_o$ should be positive so that the transistor is active and can output power to the load. As shown in FIG. 3A, an increase in $|V_2\_2f_o|$ can generally increase the net fundamental output power $Po\_f_o$ due to the increase of fundamental current. As shown in FIG. 3B, as $|V_2\_2f_o|$ increases, the second-harmonic output power $Po\_2f_o$ increases first, then reaches a peak value but drops for high $\oplus V_2\_2f_o|$. It can be understood as the increase of $|V_2\_2f_o|$ will reduce the second-harmonic current as discussed (see FIG. 1B), but the output power is the product of the voltage and current, a peak value can be expected. The positive harmonic feedback mentioned above can also be appreciated from FIGS. 3A and 3B. The factor F_Pgen in FIG. 3C is a trade-off between $Po\_f_o$ and $Po\_2f_o$, and the final condition can be chosen under the maximum F_Pgen so that $Po\_f_o$ is large enough to compensate the passive loss and $Po\_2f_o$ is still high enough. As shown in FIG. 3C, in this example, the maximum F_Pgen is 2.17 $mW^2$ under $|V_2|$=1.4 V, $|V_2\_2f_o|$=0.35 V. However, under this condition, the voltage at drain terminal may exceed the maximum drain voltage level $V_{max\_D}$ which is assumed to be 3 V. Therefore, in this example, another safer peak F_Pgen of 1.86 $mW^2$ under $|V_2|$=1.3 V, $|V_2\_2f_o|$=0.28 V is used. By changing $V_D$ and performing the same sweeping procedure, it has been found that lower $V_D$ will lead to lower F_Pgen. Increasing $V_D$ will increase the maximum F_Pgen, but the maximum voltage at drain terminal will always exceed $V_{max\_D}$.

In one embodiment, with the chosen condition and using the corresponding fundamental voltages and currents ($V_1$, $V_2$, $I_1$, $I_2$), an oscillator with a T-embedding network as shown in FIG. 2B can be synthesized using the formula below:

$$\begin{bmatrix} 0 & \frac{I_{1R}}{Q_1} - I_{1I} & 0 & \frac{I_{1R} + I_{2R}}{Q_3} - (I_{1I} + I_{2I}) \\ 0 & \frac{I_{1I}}{Q_1} + I_{1R} & 0 & \frac{I_{1I} + I_{2I}}{Q_3} + (I_{1R} + I_{2R}) \\ I_{2R} & 0 & -I_{2I} & \frac{I_{1R} + I_{2R}}{Q_3} - (I_{1I} + I_{2I}) \\ I_{2I} & 0 & I_{2R} & \frac{I_{1I} + I_{2I}}{Q_3} + (I_{1R} + I_{2R}) \end{bmatrix} \begin{bmatrix} R_2 \\ X_1 \\ X_2 \\ X_3 \end{bmatrix} = \begin{bmatrix} -V_{1R} \\ -V_{1I} \\ -V_{2R} \\ -V_{2I} \end{bmatrix}, \quad (1)$$

where the subscripts R and I denote the real and imaginary parts of the voltages and currents, respectively.

FIG. 2B also shows the synthesized AC lumped equivalent circuit of the oscillator. The calculated component values of the synthesized oscillator and corresponding conditions are listed in Table I.

TABLE I

| Synthesized oscillator component values | | | | | | | | | |
|---|---|---|---|---|---|---|---|---|---|
| $V_G$, $V_D$, (V) | $\lvert V_1\rvert$ (V) | $\lvert V_2\rvert$, $\lvert V_2\_2f_0\rvert$ (V) | $P_O\_f_0$ (mW) | $P_O\_2f_0$ (mW) | F_Pgen ($mW^2$) | $L_G$ (H), $R_G$ (Ω), $Q_1$ | $L_D$ (H), $R_D$ (Ω), $Q_2$ | $C_S$ (F), $R_S$ (Ω), $Q_3$ | $Z_O\_2f_0$ (Ω) |
| 1.1, 1.4 | 0.9 | 1.3, 0.28 | 3.7 | 0.5 | 1.86 | 20.3p, 3.0, 10 | 23.0p, 2.98, 11.4 | 17.6f, 3.84, −10 | 7.8 + j23.4 |

Based on the simulation setup in FIG. 2A, the optimum second-harmonic impedance Zo_2$f_o$ loaded at the drain-source can be calculated and is also shown in Table I. However, the condition for maximum second-harmonic power generation from a transistor may not lead to the maximum power delivered to the load. The resistive loss in the drain inductor may dissipate a large amount of second-harmonic power.

Figure 4A:
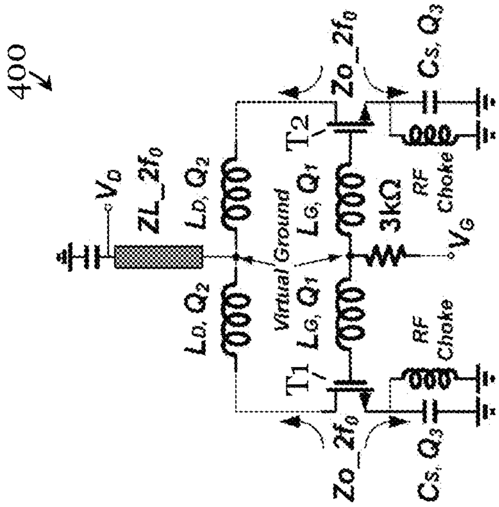
FIG. 4A is a schematic diagram of a differential oscillator in one embodiment.

To avoid one or more of these potential issues, in one embodiment, a differential oscillator is designed. FIG. 4A shows such a differential oscillator 400 in one embodiment. As shown in FIG. 4A, the differential oscillator 400 includes two transistors T1, T2, operably connected with each other via a circuit. The circuit could be implemented using transmission lines. The circuit includes a gate inductor $L_G$ connected to the gate terminal of the transistor T1, a drain inductor $L_D$ connected to the drain terminal of the transistor T1, a source inductor (operable as RF choke) connected to the source terminal of the transistor T1, a capacitor Cs connected to the source terminal of the transistor T1 and electrically connected in parallel with the source inductor. The source inductor and the capacitor Cs are both connected to ground. The circuit also includes a gate inductor $L_G$ connected to the gate terminal of the transistor T2, a drain inductor $L_D$ connected to the drain terminal of the transistor T2, a source inductor (operable as RF choke) connected to the source terminal of the transistor T2, a capacitor Cs connected to the source terminal of the transistor T2 and electrically connected in parallel with the source inductor. The source inductor and the capacitor Cs are both connected to ground. The gate inductors of the transistors T1, T2 are connected in series, with a virtual ground node defined between the two gate inductors. A resistor is connected to the virtual ground node between the gate inductors of the transistors T1, T2. The resistor is connected to a voltage node $V_G$. The drain inductors of the transistors T1, T2 are connected in series, with a virtual ground node defined between the two drain inductors. A second-harmonic load ZL_2$f_o$ is connected to the virtual ground node between the drain inductors of the transistors T1, T2. Supply voltage $V_D$ is provided through an AC short point in the second-harmonic load ZL_2$f_o$, i.e., the shorted end of the patch antenna.

In this embodiment, the second harmonic (power) can be extracted at the virtual ground point by the second-harmonic load ZL_2$f_o$.

Figure 4B:
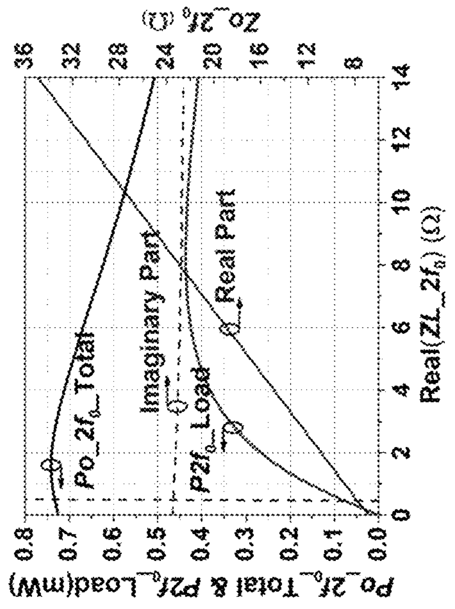
FIG. 4B is a graph showing (i) simulated output power delivered to the second-harmonic load $ZL\_2f_o$ and the total generated second-harmonic power from the transistors for different load impedance (varying the real part of $ZL\_2f_o$, the imaginary part is kept to be −11.5Ω at $2f_o$) and (ii) second-harmonic impedance seen from the drain and source ($ZO\_2f_o$) under different $ZL\_2f_o$ for the differential oscillator of FIG. 4A.

FIG. 4B is a graph that shows (i) simulated output power delivered to the second-harmonic load ZL_2$f_o$ and the total generated second-harmonic power from the transistors for different load impedance (by varying the real part of ZL_2$f_o$, the imaginary part is kept to be −11.5Ω at 2$f_o$, which is equivalent to changing Zo_2$f_o$ as shown in the right axis) and (ii) second-harmonic impedance seen from the drain and source (Zo_2$f_o$) under different ZL_2$f_o$ for the differential oscillator of FIG. 4A. It has been found at the designed condition (the dashed vertical line in FIG. 4B), even though the total generated second-harmonic power from the transistors is high, the power delivered to the load is much smaller. For the synthesized differential oscillator based on the parameters in Table I, the simulated results at the designed point show that the oscillation frequency $f_o$ is 236 GHz, $|V_1|$=0.87 V, $|V_2\uparrow$=1.3 V, $\varphi_1$=157.6°, and $V_2\_2f_o$=0.24 V. These results slightly deviate from the obtained conditions in Table I and lead to a small drop in Po_2$f_o$_Total. This may be due to the existence of higher-order harmonics in the implemented oscillator (which are assumed to be shorted in the determination of the design condition using the simulation setup in FIG. 2A). The effect of the higher-order harmonics is not significant, and these results can verify the effectiveness of the synthesis method embodiment described above. As shown in FIG. 4B, the real part of ZL_2$f_o$ could be increased to ~8Ω to maximize the delivered second-harmonic power to the load ZL_2$f_o$. A larger real part of ZL_2$f_o$ will decrease the total output of second-harmonic power from transistors, but the power delivered to the load is relatively stable.

In one embodiment, the above synthesized oscillator is implemented using transistors and transmission lines and a novel ring coupled topology is applied to effectively couple the optimized unit cells with proper mode so that the radiated power can coherently combine in the space.

Figure 5A:
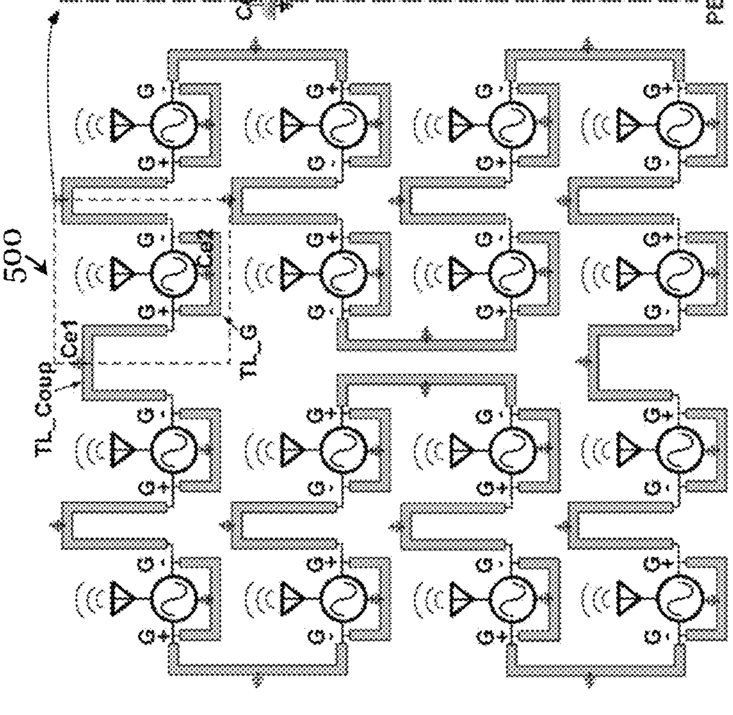
FIG. 5A is a schematic diagram of a radiator (with a 4×4 array of radiator units) for terahertz electromagnetic radiation in one embodiment.

FIG. 5A shows a radiator 50 for terahertz electromagnetic radiation in one embodiment. The radiator 50 has 16 radiator units arranged in a 4×4 array. In other embodiments, the number of radiator units can be smaller than or larger than 16. Each of the radiator unit includes an oscillator operable to generate second harmonic power and a patch antenna operably coupled with the oscillator for radiating terahertz electromagnetic radiation based on the generated second harmonic power. The oscillator may be the differential oscillator 400 of FIG. 4A, the oscillator 200 of FIG. 2B, or other oscillator not specifically illustrated. The patch antenna may be an on-chip patch antenna, as will be explained further below. The radiator units are operably coupled via a coupling arrangement. In this embodiment, the coupling arrangement includes a coupling transmission line network, which is arranged to electrically connect the plurality of radiator units in series and in an endless loop (e.g., "ring"). The coupling transmission line network may be arranged to couple adjacent radiator units out-of-phase at fundamental frequency and as a result the second harmonics radiated from the patch antennas will combine in-phase in free space.

Figure 5B:
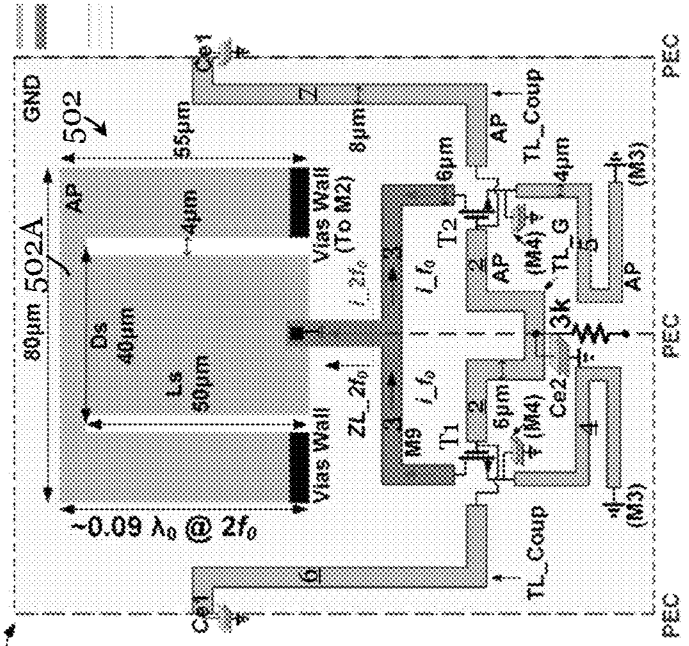
FIG. 5B is a close-up view of a radiator unit of the radiator in FIG. 5A.

FIG. 5B shows the detailed structure of a radiator unit 500 of the radiator 50 in one embodiment. In this embodiment, the radiator unit 500 includes a differential oscillator like the differential oscillator 400 in FIG. 4A, with the circuit, in particular the inductive components, implemented by transmission lines. As shown in FIG. 5B, the differential oscillator includes two transistors T1, T2, and a transmission line network connecting the two transistors T1, T2. In this embodiment, the transistors T1, T2 are each configured and/or controlled to operate in an active region and/or a triode region for facilitating generation of the second harmonic power, and the transistors T1, T2 are each respectively configured and/or controlled to optimize its respective (net) fundamental output power and its respective second harmonic output power.

Referring to FIG. 5B, the transmission line network includes a first transmission line portion 1 operable as a second harmonic load for facilitating extraction of the second harmonic power. In this embodiment, an impedance of the second harmonic load and an input impedance of the patch antenna 502 are substantially matched (e.g., the same). The transmission line network also includes a second transmission line portion 2 connected between the gate terminals of the transistors T1, T2 and operable as gate inductors of the transistors T1, T2. The second transmission line portion 2 includes a generally U-shaped portion and two generally collinear straight portions connected at two ends of the generally U-shaped portion. A resistor is connected at or near a mid-point of the second transmission line portion 2. The transmission line network also includes a third transmission line portion 3 connected between drain terminals of the transistors T1, T2 and operable as drain inductors of the transistors T1, T2. The third transmission line portion 3 includes two generally L-shaped portions connected end-to-end. The third transmission line portion 3 is arranged as metal layer/portion M9. The first transmission line portion 1 is connected at or near a mid-point of the third transmission line portion 3. The transmission line network also includes a fourth transmission line portion 4 connected to a source terminal of the transistor T1 and operable as a source inductor (or RF choke) of the transistor T1, and a fifth transmission line portion 5 connected to a source terminal of the transistor T2 and operable as a source inductor (or RF choke) of the transistor T2. Each of the fourth transmission line portion 4 and the fifth transmission line portion 5 includes a generally U-shaped portion and a straight portion connected at an end of the generally U-shaped portion. Both the fourth transmission line portion 4 and the fifth transmission line portion 5 are connected to ground (e.g., metal layer/portion M3).

The differential oscillator also includes a first capacitor connected to source terminal of the transistor T1 and a second capacitor connected to source terminal of the transistor T2. The first capacitor is connected electrically parallel to the fourth transmission line portion 4. The second capacitor is connected electrically parallel to the fifth transmission line portion 5. Both the first and second capacitors are arranged in metal layer/portion M4 and are connected to ground.

As shown in FIG. 5B, the radiator unit **50*o* also includes two coupling transmission lines 6, 7, each arranged to connect with a respective adjacent radiator unit. The two coupling transmission lines 6, 7 are connected with the respective gate terminal of the transistors T1, T2 and are operable as respective gate inductor of the transistors T1, T2. In this embodiment, the differential oscillator also includes an even-mode suppression circuit. In this embodiment, the even-mode suppression circuit includes a capacitor Ce1 connected to the first coupling transmission line 1, a capacitor Ce1 connected to the second coupling transmission line, and a capacitor Ce2 connected to the second transmission line portion 2. These capacitors Ce1, Ce2** are arranged to electrically short the even-mode signals.

Still referring to FIG. 5B, the patch antenna 502 includes a patch element 502A (metal layer/portion AP) arranged on a first face (e.g., a metal layer) of a substrate. The patch element 502A is directly connected with the oscillator via the first transmission line portion 1. In this example, the patch antenna includes a shorting arrangement, in the form of two vias walls connected to metal layer/portion M2, arranged on a side of the patch element closest to the oscillator. The patch element 502A includes a pair of elongated slots that open at the side with the shorting arrangement. The pair of elongated slots arranged generally in parallel and has substantially the same length.

Figure 5C:
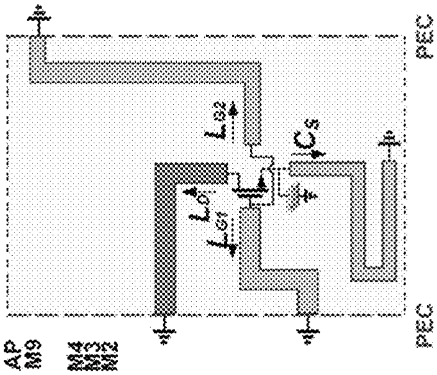
FIG. 5C is a schematic diagram of a half equivalent circuit of the radiator unit of FIG. 5B.
Figure 5D:
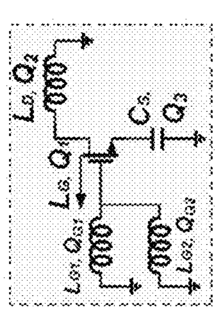
FIG. 5D is a schematic diagram of a lumped equivalent circuit of the radiator unit of FIG. 5B.

FIG. 5C shows a half equivalent circuit of the radiator unit of FIG. 5B and Figure shows a lumped equivalent circuit of the radiator unit of FIG. 5B. In this example the transistor size is l/w=60 nm/16 μm. The dimensions of the transmission lines and capacitors are determined using the EM simulator ANSYS HFSS based on the synthesized component values. As mentioned, in some embodiments, the second-harmonic load impedance should be carefully chosen to maximize the extracted power. In some embodiments, a miniature on-chip patch antenna is designed and used as the antenna to match the optimum impedance.

In the above design in FIGS. 5A and 5B, once the oscillators are correctly coupled, the gate inductor $L_G$ can be separated into two parallel inductors ($L_{G1}$ and $L_{G2}$). Different $L_{G1}$ and $L_{G2}$ will lead to different lengths of coupling transmission lines TL_Coup and TL_G and can allow bending or turning of the transmission lines.

Figure 6A:
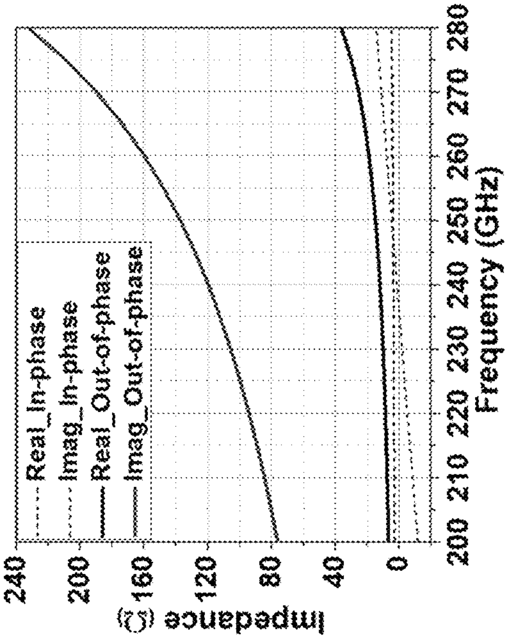
FIG. 6A is a graph showing an input impedance of the coupling transmission line TL_Coup in FIG. 5B under in-phase and out-of-phase excitations.

With this arrangement, the element (radiator unit) spacing can be tuned to fit the antenna's dimensions to achieve a compact layout and low radiation side lobe. As shown in FIG. 5B, the even mode suppression capacitors Ce1 and Ce2 are loaded at the PEC boundaries, with no undesired effects for the differential oscillation and coupling. The values of the capacitors are tuned to short the even-mode signal. For example, the input impedance of coupling transmission line TL_Coup under in-phase and out-of-phase excitations is shown in FIG. 6A. The input impedance is the designed value under out-of-phase excitation, but the input impedance is very small under in-phase excitation, suppressing the undesired modes.

As mentioned, in some embodiments, a miniature on-chip patch antenna is used as the antenna to make the design scalable in 2 dimension (2D). Its input impedance can be tuned without using extra components to match the optimum impedance. Moreover, a quartz superstrate can be added for improving radiation efficiency.

Figure 6B:
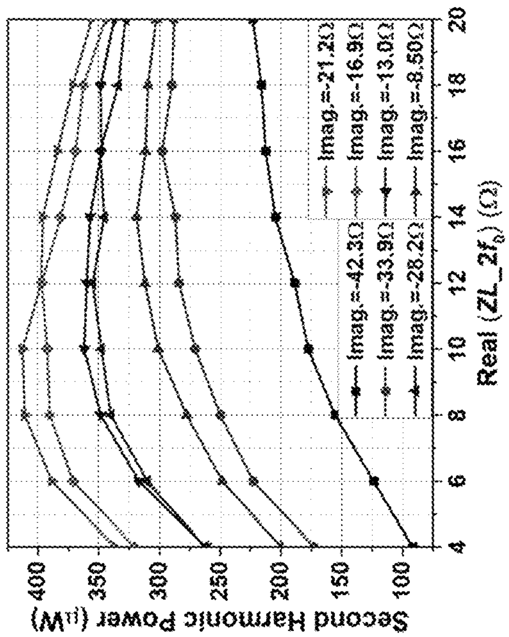
FIG. 6B is a graph showing a simulated extracted second-harmonic power (at ~470 GHz, $V_G$=1.1 V, $V_D$=1.4 V) with different second-harmonic load impedance $ZL\_2f_o$ in FIG. 5B.

As described, in some embodiments, the second-harmonic load impedance $ZL\_2f_o$ is an important factor for high extracted power. Therefore, based on the implemented unit cell, the load impedance $ZL\_2f_o$ is varied to determine the optimum impedance. FIG. 6A shows an input impedance of the coupling transmission line TL_Coup in FIG. 5B under in-phase and out-of-phase excitations. FIG. 6B shows a simulated extracted second-harmonic power (at ~470 GHz, $V_G$=1.1 V, $V_D$=1.4 V) with different second-harmonic load impedance ZL_2$f_o$ in FIG. 5B. In this example, the optimum ZL_2$f_o$ is ~10+j21.2Ω for maximum output power. The input impedance of the antenna should match this optimum impedance.

The inventors of the invention have realized that the resonant length of a conventional patch antenna is about half wavelength (in the substrate). By adding a shorting wall or a shorting pin, the length can be reduced by half, i.e., to a quarter wavelength. In some embodiments, the shorting wall is used to reduce the length of the patch antenna, and the resonant length is smaller than a quarter wavelength.

Figures 7A, 7B, 7C:
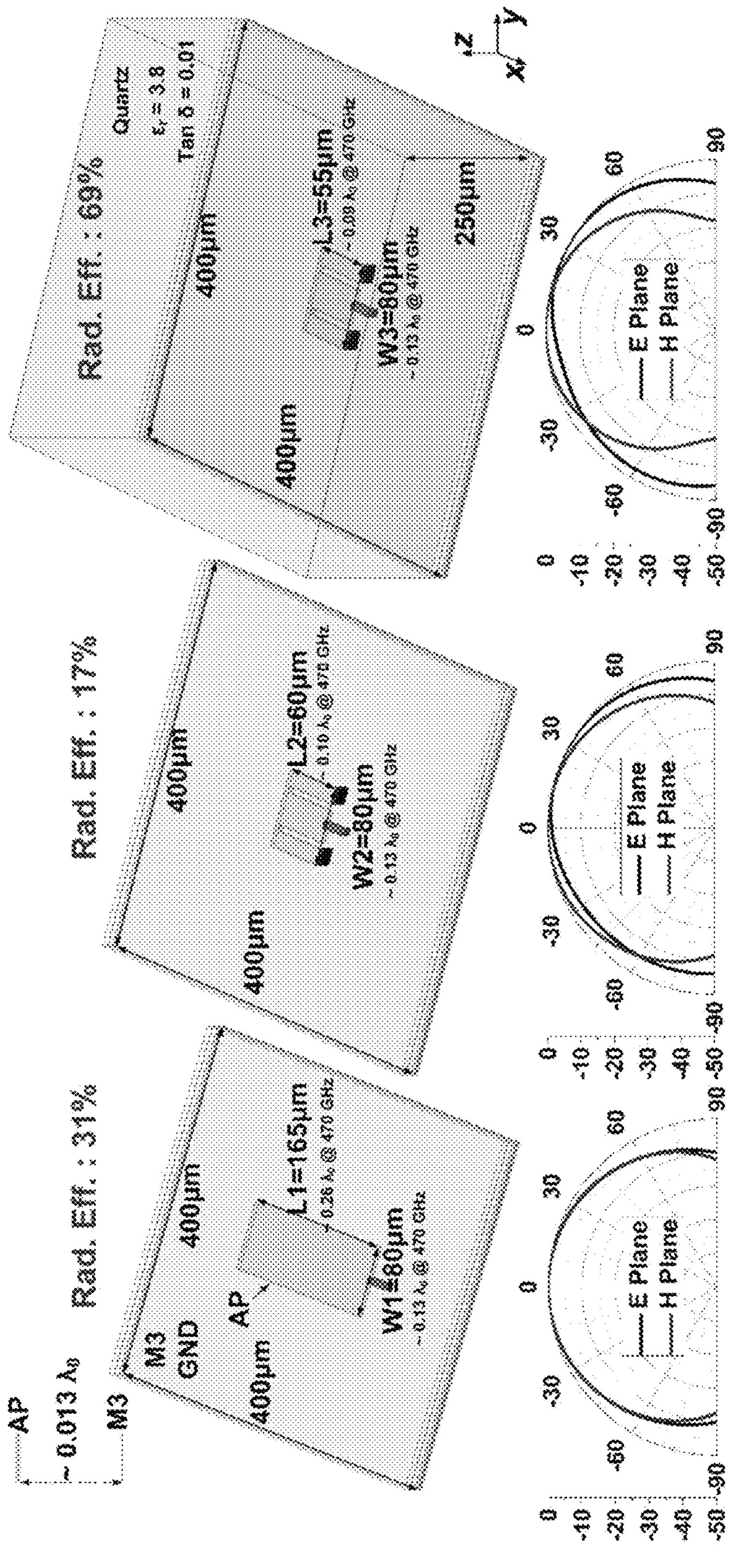
FIG. 7A is a schematic diagram of a patch antenna in one example and the related simulated radiation pattern ($\lambda_o$ is the free space wavelength at 470 GHz)
FIG. 7B is a schematic diagram of a miniature on-chip patch antenna in one example and the related simulated radiation pattern ($\lambda_o$ is the free space wavelength at 470 GHz)
FIG. 7C is a schematic diagram of a miniature on-chip patch antenna with a quartz superstrate in one example and the related simulated radiation pattern ($\lambda_o$ is the free space wavelength at 470 GHz)

FIG. 7A shows a patch antenna in one example and the related simulated radiation pattern ($\lambda_o$ is the free space wavelength at 470 GHz) while FIG. 7B shows a miniature on-chip patch antenna in one example and the related simulated radiation pattern ($\lambda_o$ is the free space wavelength at 470 GHz).

It is noted the shorting wall can also be used for the DC power supply. However, the compact design will lead to the antenna's resonant frequency shifting to a higher frequency, making it difficult to match the optimum capacitive impedance. Therefore, as shown in FIG. 7B, the antenna in one embodiment is fed from the via wall side and two slots are introduced in the patch element to form new current paths for resonance at a lower frequency. The impedance matching can be done by tuning the dimensions of the slots without using extra components, which will be explained in further detail below. The operation principle is similar to the U-slot patch antenna with a shorting pin or a shorting wall. However, the design in this embodiment only utilizes two simple slots to obtain the function and is more suitable for a planar feeding method. Moreover, the miniature patch antenna's width is further reduced to ~0.13$\lambda_o$, where $\lambda_o$ is the wavelength in free space, which is as compact as a miniature half-patch antenna. The design in this embodiment can directly reduce the width to avoid asymmetry.

With the thin on-chip substrate thickness (0.013$\lambda_o$), the compact width will reduce radiation efficiency due to the small radiation resistance. For a regular on-chip patch antenna at ~500 GHz, the radiation efficiency can be higher than 40%. With a compact width of ~0.13$\lambda_o$, the radiation efficiency is reduced to 31%, as shown in FIG. 7A. The radiation efficiency of our proposed antenna is even much lower, as shown in FIG. 7B. To boost the radiation efficiency, in one embodiment, a superstrate such as a quartz superstrate is applied or arranged on top of the patch antenna. FIG. 7C shows a miniature on-chip patch antenna with a quartz superstrate in one example and the related simulated radiation pattern ($\lambda_o$ is the free space wavelength at 470 GHz). As shown in FIG. 7C, a quartz superstrate with 250-μm thickness (~3$\lambda_{quartz}$/4) is superimposed on the miniature antenna, and the radiation efficiency is significantly improved from 17% to 69%. The corresponding radiation patterns are also shown and it can be seen that the radiation pattern in the E plane is slightly tilted compared to the conventional half-wavelength patch antenna.

As mentioned, the input impedance of the antenna can be tuned to match the optimum impedance for high output power using the slots.

Figure 8A:
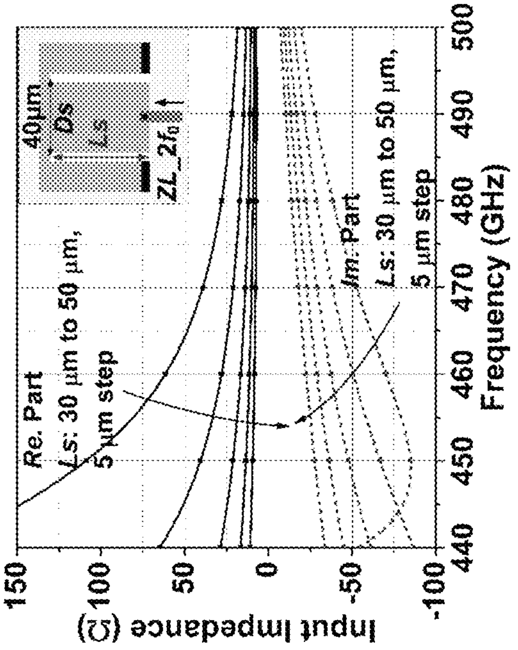
FIG. 8A is a graph showing input impedance curves for the antenna with quartz superstrate in FIG. 7C, obtained by varying Ls from 30 μm to 50 μm with 5-μm step while keeping Ds fixed at 40 μm.
Figure 8B:
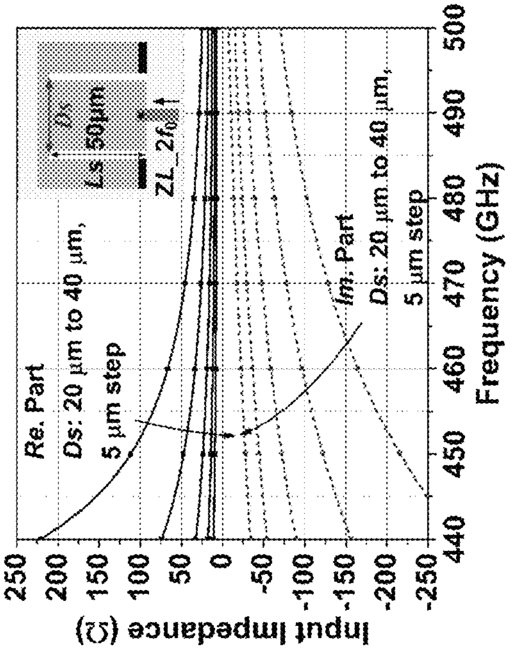
FIG. 8B is a graph showing input impedance curves for the antenna with antenna quartz superstrate in FIG. 7C, obtained by varying Ds from 20 μm to 40 μm with 5-μm step while keeping Ls fixed at 50 μm.

FIG. 8A shows input impedance curves for the antenna with quartz superstrate in FIG. 7C, obtained by varying Ls from 30 μm to 50 μm with 5-μm step while keeping Ds fixed at 40 μm. FIG. 8B shows input impedance curves for the antenna with antenna quartz superstrate in FIG. 7C, obtained by varying Ds from 20 μm to 40 μm with 5-μm step while keeping Ls fixed at 50 μm. As shown in FIGS. 8A and 8B, the input impedance of the proposed miniature antenna can be effectively adjusted by varying the slot length Ls and the spacing of the two slots Ds. In this example, Ls and Ds are chosen to be 50 μm and 40 μm so that the antenna input impedance is close to the optimum ZL_2$f_o$. It is noted that the quartz superstrate is added in the simulation setup when the passive components, including the antenna, are designed. The simulated output power delivered to the antenna is ~360 μW, which is ~90% of the maximum value. The simulated radiation pattern of the array is given and compared with measured results, and it has been found that the beam tilt in the E-plane radiation pattern is not significant in the array application.

Figure 9B:
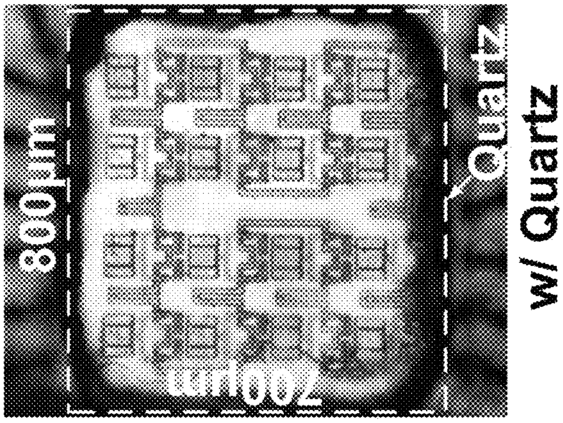
FIG. 9B is a micrograph of a fabricated integrated circuit (chip) with quartz superstrate in one embodiment.
Figure 9A:
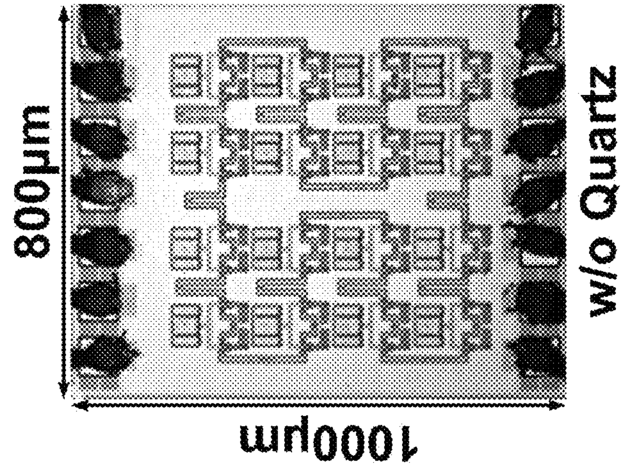
FIG. 9A is a micrograph of a fabricated integrated circuit (chip) without quartz superstrate in one embodiment.

To test the design and features described above, a 16-element ring coupled oscillator-radiator array is designed and fabricated using TSMC 65-nm CMOS technology. The micrograph of the oscillator-radiator array is shown in FIG. 9A. The total chip size is 1 mm×0.9 mm, and the core size is 0.7 mm×0.8 mm. A quartz superstrate is manually attached to the top of the core area of the chip with SU8 under a microscope, as shown in FIG. 9B. Based on simulation, a 20-μm air gap will reduce ~30% radiation efficiency. Thus caution is needed to ensure proper/good contact between the quartz and the chip to achieve more efficient power radiation. The performances for both chips are measured. In one embodiment, an elliptical PTFE lens is used to improve the radiated waves' directivity.

Figure 10A:
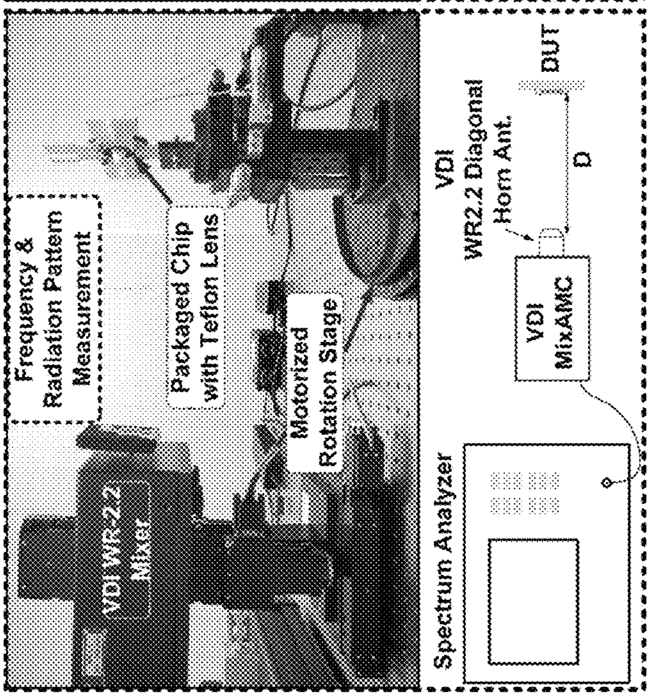
FIG. 10A is a photograph and a corresponding schematic of a setup for performing frequency and radiation pattern measurement in one example.
Figure 10B:
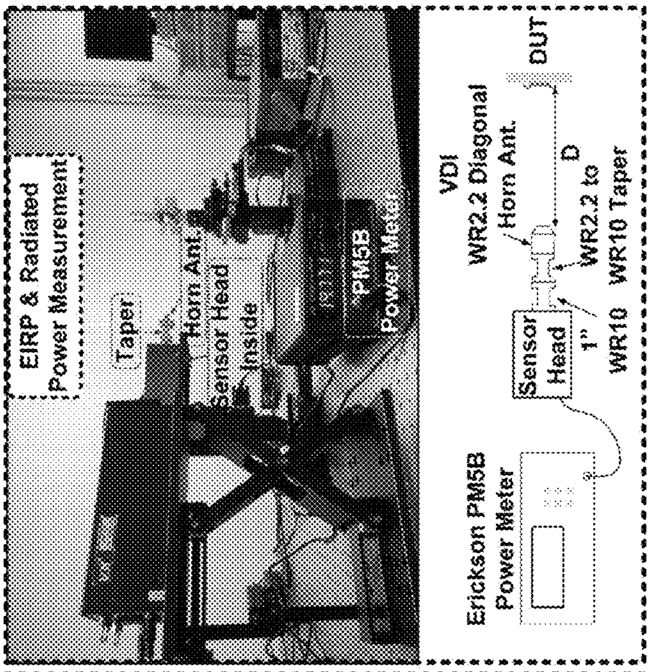
FIG. 10B is a photograph and a corresponding schematic of a setup for performing effective isotropic radiated power (EIRP) and radiated power measurement in one example.

The photographs of the measurement setups for performing frequency and radiation pattern measurement and for performing effective isotropic radiated power (EIRP) and radiated power measurement in some embodiments are shown in FIGS. 10A and 10B.

In FIG. 10A, the output frequency is received by the VDI WR2.2 diagonal horn antenna and detected by the VDI WR2.2 mixer connected to the Agilent PXA N9030A signal analyzer. In FIG. 10B, the received power by the horn antenna is directly measured using an Erickson PM5B power meter. Combined with the known loss of the waveguide and taper, the gain of the horn antenna, and the distance D (see FIG. 10B), the radiated EIRPs for the three cases can be calculated using the Friis equation.

Figure 11A:
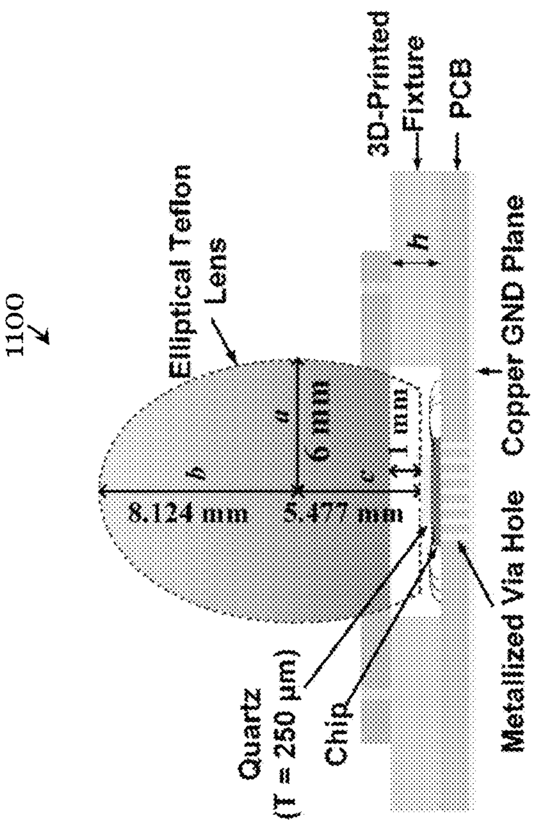
FIG. 11A is a schematic diagram showing a configuration of a packaged chip with a lens in one embodiment.

FIG. 11A shows a configuration of device 1100 arranged to radiate terahertz electromagnetic radiation in one embodiment. The device 1100 includes a packaged chip incorporating a radiator of FIGS. 5A-5D and an elliptical PTFE lens generally aligned with the radiator units of the radiator, or a phase center of the radiator units (e.g., radiator array), for affecting directivity of the terahertz electromagnetic radiation. In one example, the lens comprises a truncated ellipsoidal boundary surface. The device 1100 also includes a PCB substrate, with the packaged chip arranged on one face and a ground plane arranged on an opposite face. A support structure (e.g., additively manufactured structure) supports the lens above the integrated circuit (chip), with the integrated circuit (chip) is placed at or near a focus of the ellipse associated with the truncated ellipsoidal boundary surface. In this embodiment, the lens is an elliptical PTFE lens truncated for placing the chip at its focus. The distance h between the lens and PCB can be adjusted using different support structures (e.g., adjustable and/or replaceable support structures) in the measurement for a high directivity.

Figure 11B:
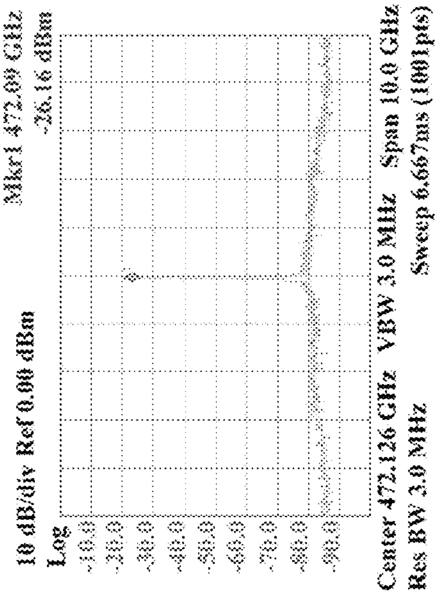
FIG. 11B is a graph showing the measured output spectrum at 472 GHz for the configuration in FIG. 11A.

FIG. 11B shows the measured output spectrum at 472 GHz for the configuration in FIG. 11A.

Figure 12B:
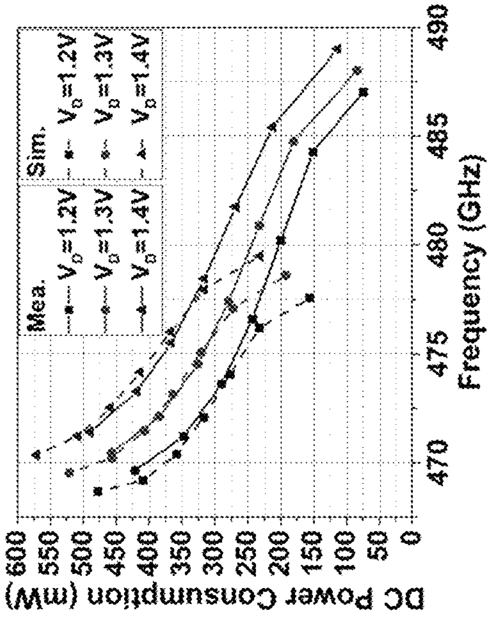
FIG. 12B is a graph showing the corresponding DC power consumption for the chip without quartz superstrate.
Figure 12A:
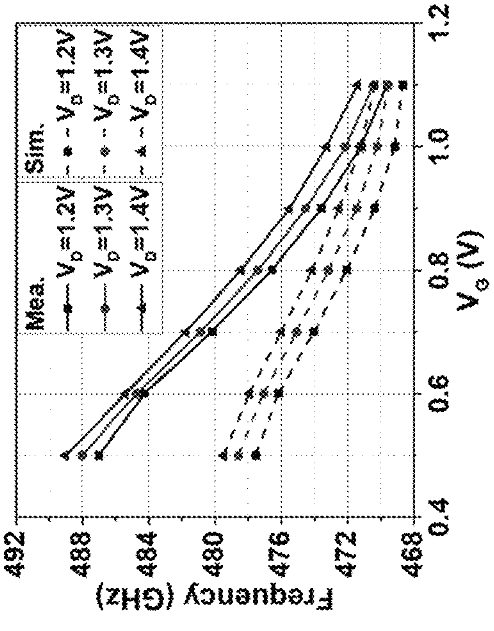
FIG. 12A is a graph showing simulated and measured output frequencies for the chip without quartz superstrate.

FIG. 12A shows simulated and measured output frequencies for the chip without quartz superstrate and FIG. 12B shows the corresponding DC power consumption for the chip without quartz superstrate. As shown in FIG. 12A, the measured output frequencies are tuned from 469 GHz to 489 GHz (4.2%) by varying the bias voltage $V_G$ and supply voltage $V_D$. The simulated output frequencies are also plotted in FIG. 12A, and the tuning range is narrower than the measured one. The corresponding DC power consumption is shown in FIG. 12B.

Figure 13A:
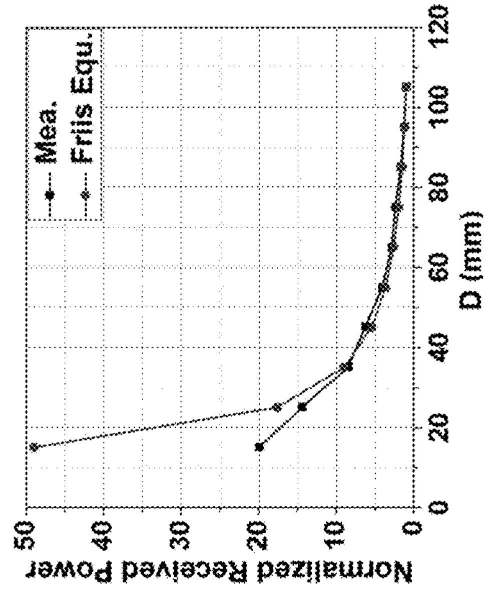
FIG. 13A is a graph showing normalized received power versus distance for the configuration without the lens and a corresponding comparison with Friis transmission equation.
Figure 13B:
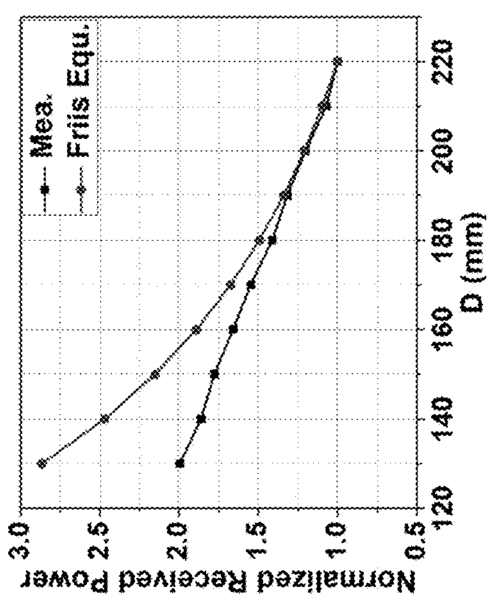
FIG. 13B is a graph showing normalized received power versus distance for the configuration with the lens and a corresponding comparison with Friis transmission equation.
Figure 15A:
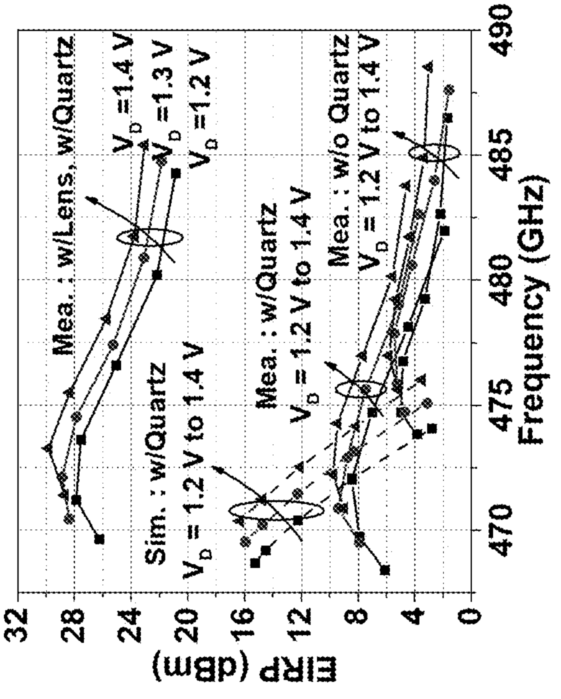
FIG. 15A is a graph showing simulated and measured effective isotropic radiated power (EIRP) for the chips without quartz superstrate, with quartz superstrate, and with quartz superstrate and with PTFE lens.
Figure 15B:
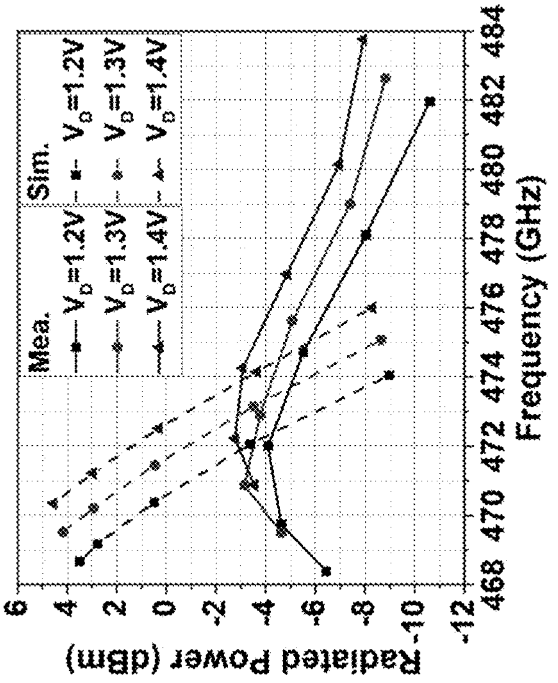
FIG. 15B is a graph showing simulated and measured radiated power for the chip with quartz superstrate.
Figure 16A:
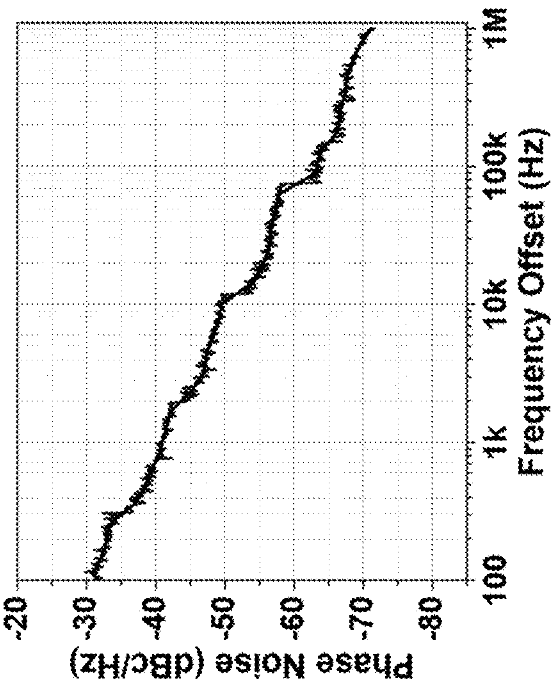
FIG. 16A is a graph showing measured phase noise at 472 GHz.
Figure 16B:
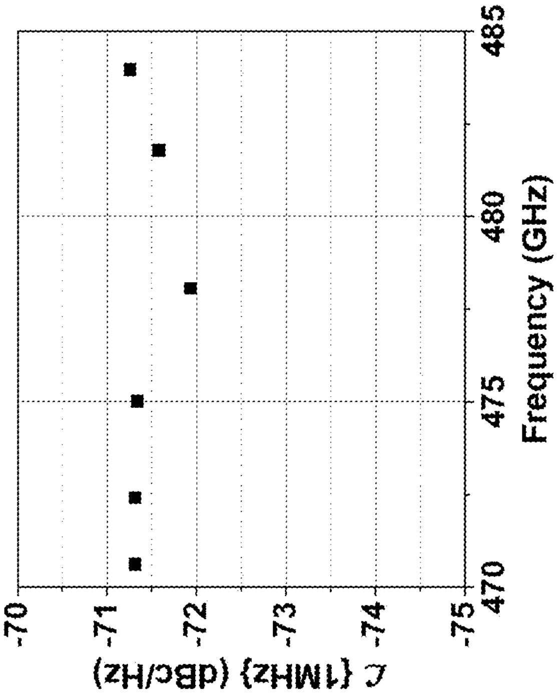
FIG. 16B is a graph showing measured phase noise at the 1-M frequency offset from 471 GHz to 484 GHz.

The received power under various distances D is measured and compared with the Friis equation. FIG. 13A shows normalized received power versus distance for the configuration without the lens and a corresponding comparison with Friis transmission equation. FIG. 13B shows normalized received power versus distance for the configuration with the lens and a corresponding comparison with Friis transmission equation. It can be observed that the far-field distance should be larger than 35 mm and 190 mm for the chip without and with the lens, respectively. The radiation patterns are measured in the far-field region by rotating the chip using the motorized rotation stage (on which the packaged chip is placed).

adding a quartz superstrate can effectively improve the EIRP by ~4 dB, which is originated from the increase of radiated power due to the improvement of radiation efficiency. For the case with the PTFE lens, the EIRP is boosted significantly because most radiated waves are concentrated, as shown in FIG. 14C. The measured maximum EIRP with the lens is ~30 dBm under 1.4 V supply voltage. As shown in FIG. 15A, the simulated EIRP for the case with quartz is higher than the measured result, which may come from the model inaccuracy, especially the resistive loss of the passive components may be underestimated. The non-ideal contact between the quartz superstrate and the chip may also bring extra loss. The radiated power can be calculated by subtracting the measured directivities from the measured EIRPs. FIG. 15B shows the simulated and measured radiated power for the case with a quartz superstrate. FIG. 16A shows the measured phase noise at 472 GHz, and FIG. 16B shows the measured phase noise at the 1-MHz offset from 471 GHz to 484 GHz. Some measured performance characteristics of the above radiator embodiments are listed in Table II.

TABLE II

Performance characteristics of some radiator embodiments

| Radiating Element & Array Size | | Frequency ($f_0$) (GHz) | Tuning Range (%) | Supply Voltage (V) | EIRP (dBm) | $P_{rad}$ (dBm) | $P_{DC}$ (W) | DC-to-THz Efficiency (%) | Λ {X MHz} (dBc/Hz) | Area ($mm^2$) | $P_{rad}$/Area ($mW/mm^2$) | Technology |
|---|---|---|---|---|---|---|---|---|---|---|---|---|
| Mini. Patch | w/o | 472 (236) | 4.2 | 1.2 | 8.5[a] | −4.1 | 0.317 | 0.123 | −71.3 | 0.56 | 0.49 (Full) | 65-nm |
| Antenna | Lens | 469-489 | | 1.4 | 9.8[b] | −2.8 | 0.444 | 0.12 | (1 MHz) | (Core) | 0.66 (Full) | CMOS |
| with Quartz | w/ | | | 1.2 | 27.9[c] | −5.8 | 0.348 | 0.08 | | 0.8 | 0.33 (Full) | |
| Superstrate | PTFE | | | 1.4 | 29.9[d] | −3.8 | 0.419 | 0.1 | | (Full) | 0.52 (Full) | |
| (4 × 4) | lens | | | | | | | | | | | |

Note:
[a]@ 472 GHz,
[b]@ 472.2 GHz,
[c]@ 471.2 GHz,
[d]@ 473.3 GHz

Figure 14B:
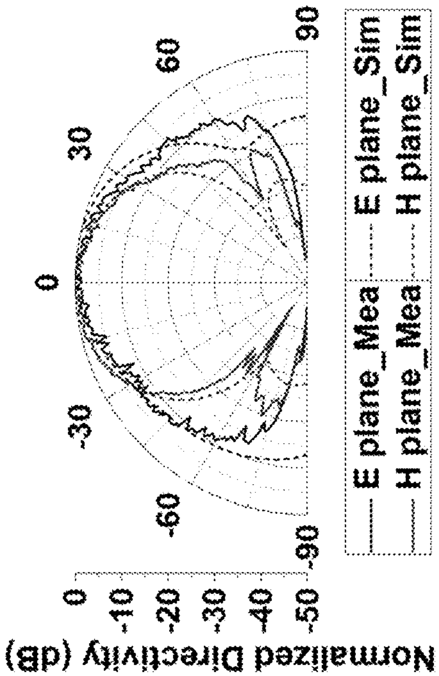
FIG. 14B is a graph showing simulated and measured normalized radiation pattern at ~472 GHz for the configuration with quartz superstrate (and no lens)
Figure 14A:
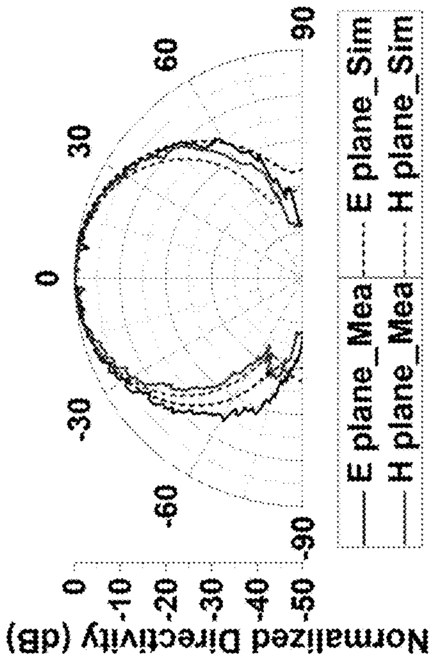
FIG. 14A is a graph showing simulated and measured normalized radiation pattern at ~472 GHz for the configuration without quartz superstrate (and no lens)
Figure 14D:
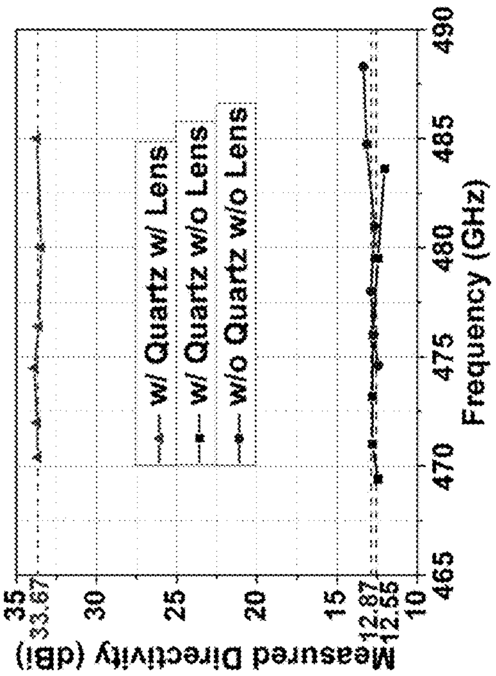
FIG. 14D is a graph showing measured directivities in the frequency band (dashed line: average directivity) for the configurations used for obtaining the results in FIGS. 14A-14C.
Figure 14C:
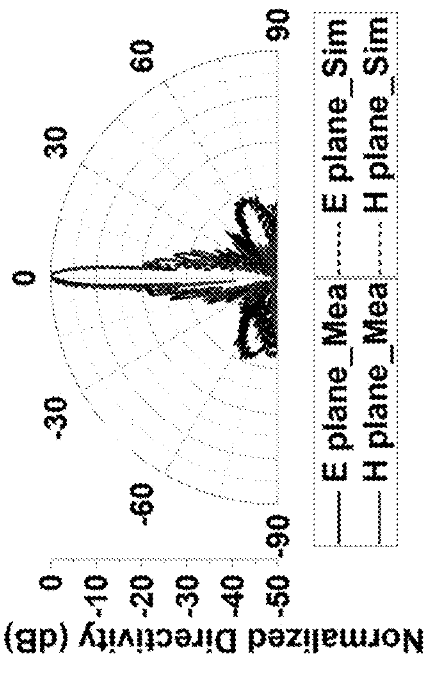
FIG. 14C is a graph showing simulated and measured normalized radiation pattern at ~472 GHz for the configuration with quartz superstrate and polytetrafluoroethylene (PTFE) lens.

FIGS. 14A, 14B, and 14C show the simulated and measured radiation patterns of the chip alone (no lens), the chip with quartz superstrate (no lens), and the chip with quartz superstrate and PTFE lens, respectively. As shown in these Figures, the simulated and measured radiation patterns match quite well, which manifests that the array is under the desired coupling mode. The radiation patterns within the tuning range are measured for the three cases, and the corresponding directivities are calculated and shown in FIG. 14D. As shown in FIG. 14D, the directivity variation is small in the tuning range for each case. Therefore, in this example, the average directivities shown in FIG. 14D are used for the radiated power calculation. Because the radiation loss in cross-polarization is not considered in the calculation, the measured directivity without the lens is ~1 dB higher than the simulated value. For a high-directivity source, this error is not significant. For the case with the lens, the measured directivity is ~0.2 dB higher than the simulated result.

Figure 17:
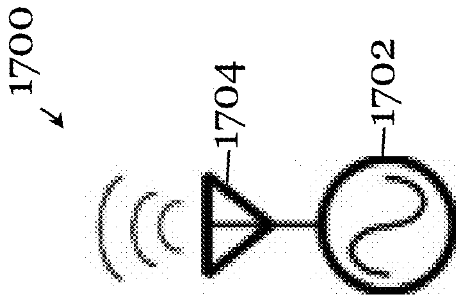
FIG. 17 is a schematic diagram of a radiator for terahertz electromagnetic radiation in one embodiment.

FIG. 15A shows simulated and measured effective isotropic radiated power (EIRP) for the chip without quartz superstrate (no lens), the chip with quartz superstrate (no lens), and the chip with quartz superstrate and PTFE lens. FIG. 15B shows simulated and measured radiated power for the chip with quartz superstrate. As shown in the Figures, FIG. 17 shows a radiator 1700 in one embodiment of the invention. In this embodiment, the radiator 1700 includes a single radiator unit, which has an oscillator 1702 operable to generate second harmonic power and a patch antenna 1704 operably coupled with the oscillator 1702 for radiating terahertz electromagnetic radiation based on the generated second harmonic power. The terahertz electromagnetic radiation can be between about 0.3 THz and about 3 THz, although other terahertz frequency, frequencies, or frequency ranges are also contemplated.

The radiator embodiments of the invention can be incorporated into a system arranged to generate and radiate terahertz electromagnetic radiation (signals). The system may be a sensing system, a communication system, a spectroscopic system, an imaging system, etc. Likewise, the device embodiments for radiating terahertz electromagnetic radiation (signals) of the invention can be incorporated into a system arranged to generate and radiate terahertz electromagnetic radiation (signals). The system may be a sensing system, a communication system, a spectroscopic system, an imaging system, etc. In some embodiments, the invention also provides an integrated circuit (chip) with one or more of the radiators embodiments.

The above disclosure has provided, among other things, a systematic design method to determine the component values for a single differential high-power harmonic oscillator. The above disclosure has also provided a ring-coupled oscillator topology and a miniature on-chip patch antenna design, which can make the oscillator/radiator scalable (in 2D array) and can provide a relatively compact chip area. Some examples of the radiators includes a quartz superstrate to improve radiation efficiency. Some examples of the radiators can be used with a lens, such as a relatively low-cost PTFE lens, for radiating a highly directive beam. One or more of the techniques in the above disclosure can facilitate large-scale, high power-efficiency, and/or high area-efficiency THz radiator array with good beam quality.

Some embodiments of the invention use a "ring" (endless) coupling architecture is, and the element spacing can be easily tuned for low side lobe radiation. Some embodiments of the invention uses an miniature on-chip patch antenna as the antenna of the radiator, which makes the design more compact and readily scalable in 2D, facilitates heat dissipation and/or avoids the need of an expensive silicon lens. Some embodiments of the invention can be tuned for the desired input impedance without extra matching components. Some embodiments of the invention use a quartz superstrate to improve radiation efficiency. Some embodiments of the invention use a low-cost polytetrafluoroethylene (PTFE) or Teflon™ lens to obtain a highly directive beam. Some embodiments of the invention may be applied for terahertz applications like high-speed wireless data transmission, spectroscopy, imaging, and radar, etc. Some embodiments of the invention uses low-cost CMOS technology to generate and radiate high-power and high-frequency terahertz signals. For example, some embodiments of the invention can be part of the active terahertz imaging system to illuminate targeted objects. Some embodiments of the invention utilize miniature on-chip patch antennas to achieve high-power and high-efficiency terahertz radiation within a compact chip area. Terahertz radiation sources that radiate from the back-side of the chip often makes the chip package difficult for heat dissipation. Some embodiments of the invention employ on-chip patch antennas with size reduction to resolve this problem. This design is compact, in particular when combined with the ring scalable coupling topology. Some embodiments of the invention can also be used for 5G, 6G, or above wireless communications with further improvement.

It will be appreciated by persons skilled in the art that numerous variations and/or modifications may be made to the invention as shown in the specific embodiments to provide other embodiments of the invention. Some optional features of the invention are set forth in the summary. These optional features may be present in some embodiments and may be absent in some other embodiments. The described embodiments of the invention should therefore be considered in all respects as illustrative, not restrictive.

The invention claimed is:

1. A radiator for terahertz electromagnetic radiation, comprising one or more radiator units each including:
- an oscillator operable to generate second harmonic power; the oscillator comprising a transistor; and
- a patch antenna operably coupled with the oscillator for radiating terahertz electromagnetic radiation based on the generated second harmonic power;
- wherein the transistor is configured and/or controlled to operate in an active region and/or a triode region for facilitating generation of the second harmonic power.

2. The radiator of claim 1, wherein the oscillator comprises a differential oscillator.

3. The radiator of claim 2, wherein the differential oscillator comprises:
- a first transistor;
- a second transistor; and
- a transmission line network connecting the first transistor and the second transistor.

4. The radiator of claim 3, wherein the first transistor and the second transistor are each configured and/or controlled to operate in an active region and/or a triode region for facilitating generation of the second harmonic power.

5. The radiator of claim 3, wherein the first transistor is configured and/or controlled to optimize a fundamental output power of the first transistor and a second harmonic output power of the first transistor; and/or wherein the second transistor is configured and/or controlled to optimize a fundamental output power of the second transistor and a second harmonic output power of the second transistor.

6. The radiator of claim 1, wherein the patch antenna is an on-chip patch antenna comprising a patch element arranged on a metal layer of a substrate.

7. The radiator of claim 6, wherein the patch element of each of the one or more radiator units is arranged on the metal layer.

8. The radiator of claim 6, wherein the patch element is directly connected with the oscillator.

9. The radiator of claim 6, wherein the on-chip patch antenna comprises a shorting arrangement arranged on a side of the patch element close to the oscillator.

10. The radiator of claim 9, wherein the patch element further comprises one or more slots that open at the side with the shorting arrangement.

11. A device for radiating terahertz electromagnetic radiation, comprising: the radiator of claim 1.

12. The device of claim 11, further comprising a superstrate attached to the one or more radiator units of the radiator.

13. The device of claim 12, wherein the superstrate comprises quartz superstrate.

14. The device of claim 11, further comprising a lens generally aligned with of the one or more radiator units of the radiator for affecting directivity of the terahertz electromagnetic radiation.

15. The device of claim 14, wherein the lens comprises a polytetrafluoroethylene (PTFE) lens.

16. A radiator for terahertz electromagnetic radiation, comprising one or more radiator units each including:
- an oscillator operable to generate second harmonic power; the oscillator comprising a transistor; and
- a patch antenna operably coupled with the oscillator for radiating terahertz electromagnetic radiation based on the generated second harmonic power;
- wherein the transistor is configured and/or controlled to optimize a fundamental output power of the transistor and a second harmonic output power of the transistor.

17. A radiator for terahertz electromagnetic radiation, comprising one or more radiator units each including:
- an oscillator operable to generate second harmonic power; the oscillator comprising a differential oscillator; the differential oscillator comprising:
  - a first transistor;
  - a second transistor; and
  - a transmission line network connecting the first transistor and the second transistor; and a patch antenna operably coupled with the oscillator for radiating terahertz electromagnetic radiation based on the generated second harmonic power:

wherein the transmission line network comprises a first transmission line portion operable as a second harmonic load for facilitating extraction of the second harmonic power.

18. The radiator of claim 17, wherein the first transmission line portion is connected between a drain terminal of the first transistor and a drain terminal of the second transistor.

19. The radiator of claim 17, wherein the transmission line network further comprises:

a second transmission line portion connected between a gate terminal of the first transistor and a gate terminal of the second transistor and operable as a gate inductor of the first transistor and a gate inductor of the second transistor;

a third transmission line portion connected between a drain terminal of the first transistor and a drain terminal of the second transistor and operable as a drain inductor of the first transistor and a drain inductor of the second transistor;

a fourth transmission line portion connected to a source terminal of the first transistor and operable as a source inductor of the first transistor; and a fifth transmission line portion connected to a source terminal of the second transistor and operable as a source inductor of the second transistor.

20. The radiator of claim 19, wherein the differential oscillator further comprises:

a first capacitive circuit connected to source terminal of the first transistor; and a second capacitive circuit connected to source terminal of the second transistor.

21. The radiator of claim 19, wherein the one or more radiator units comprise a plurality of radiator units, and wherein the radiator further comprises a coupling arrangement operably coupling the plurality of radiator units.

22. The radiator of claim 21, wherein the coupling arrangement comprises a coupling transmission line network for electrically connecting the plurality of radiator units.

23. The radiator of claim 22, wherein the coupling transmission line network are arranged to electrically connect the plurality of radiator units in series and in an endless loop.

24. The radiator of claim 22, wherein the coupling transmission line network are arranged to couple adjacent radiator units out-of-phase at fundamental frequency.

25. The radiator of claim 22, wherein the coupling transmission line network comprises, for each respective one of the plurality of radiator units:

a first coupling transmission line connecting with an adjacent radiator unit; and a second coupling transmission line connecting with another adjacent radiator unit;

wherein the first coupling transmission line is connected with the gate terminal of the first transistor; and wherein the second coupling transmission line is connected with the gate terminal of the second transistor.

26. The radiator of claim 25, wherein the differential oscillator of each respective one of the plurality of radiator units further comprises:

an even-mode suppression circuit.

27. The radiator of claim 26, wherein the even-mode suppression circuit comprises:

a first capacitive circuit connected to the first coupling transmission line;

a second capacitive circuit connected to the second coupling transmission line; and a third capacitive circuit connected to the second transmission line portion.

28. A radiator for terahertz electromagnetic radiation, comprising one or more radiator units each including:

an oscillator operable to generate second harmonic power; and a patch antenna operably coupled with the oscillator for radiating terahertz electromagnetic radiation based on the generated second harmonic power; the patch antenna being an on-chip patch antenna comprising a patch element arranged on a metal layer of a substrate;

wherein the patch element of each of the one or more radiator units is arranged on the metal layer; and wherein the oscillator of each of the one or more radiator units is arranged at least partly on the metal layer.

* * * * *